US 11,457,410 B2

(12) United States Patent
Huang et al.

(10) Patent No.: US 11,457,410 B2
(45) Date of Patent: Sep. 27, 2022

(54) METHOD AND APPARATUS FOR PROVIDING POWER SAVING OF MONITORING FOR DEVICE-TO-DEVICE COMMUNICATION IN A WIRELESS COMMUNICATION SYSTEM

(71) Applicant: ASUSTek Computer Inc., Taipei (TW)

(72) Inventors: Chun-Wei Huang, Taipei (TW); Ming-Che Li, Taipei (TW); Yi-Hsuan Kung, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/941,036

(22) Filed: Jul. 28, 2020

(65) Prior Publication Data

US 2021/0037468 A1 Feb. 4, 2021

Related U.S. Application Data

(60) Provisional application No. 62/881,571, filed on Aug. 1, 2019.

(51) Int. Cl.
*H04W 52/02* (2009.01)
*H04W 4/46* (2018.01)
*H04W 72/04* (2009.01)

(52) U.S. Cl.
CPC ......... *H04W 52/0225* (2013.01); *H04W 4/46* (2018.02); *H04W 72/0406* (2013.01)

(58) Field of Classification Search
None
See application file for complete search history.

(56) References Cited

U.S. PATENT DOCUMENTS 10,448,332 B2 10/2019 Lu
2017/0142741 A1* 5/2017 Kaur ................. H04W 76/14
(Continued)

FOREIGN PATENT DOCUMENTS

WO 2018016882 1/2018
WO 2018064477 4/2018
(Continued)

OTHER PUBLICATIONS

Notice of Submission of Opinion from Korean Intellectual Property Office in corresponding KR Application No. 10-2020-0093963, dated Apr. 19, 2021.
Sequans Communications, "Discussion on Paging Relay and Sidelink Maintenance", Agenda Item 9.1.2.2, R2-1703593, 3GPP TSG-RAN WG2, Meeting #97bis, Spokane, USA, Apr. 3-7, 2017.
(Continued)

*Primary Examiner* — Kodzovi Acolatse
(74) *Attorney, Agent, or Firm* — Skaar Ulbrich Macari, P.A.

(57) ABSTRACT

A method and apparatus are disclosed from the perspective of a second User Equipment (UE) for performing sidelink communication. In one embodiment, the method includes the second UE being (pre-)configured with a sidelink resource pool in a carrier or cell, wherein a DRX (Discontinuous Reception) pattern is associated to the sidelink resource pool. The method also includes the second UE selecting a resource in the sidelink resource pool based on the DRX pattern, wherein a specific message becomes available for transmission in the second UE. The method further includes the second UE transmitting the specific message on the resource to a plurality of UEs comprising at least a first UE.

20 Claims, 30 Drawing Sheets

(56) References Cited

U.S. PATENT DOCUMENTS

| | | | |
|---|---|---|---|
| 2017/0325167 A1* | 11/2017 | Lu | H04W 52/0229 |
| 2019/0053159 A1* | 2/2019 | Wei | H04W 52/0225 |
| 2019/0053305 A1 | 2/2019 | Saiwai et al. | |
| 2019/0174411 A1* | 6/2019 | Xu | H04W 72/0406 |
| 2019/0174513 A1* | 6/2019 | Loehr | H04W 72/14 |
| 2019/0363843 A1* | 11/2019 | Gordaychik | H04L 1/1854 |
| 2020/0059915 A1* | 2/2020 | Lee | H04W 72/0406 |
| 2020/0099498 A1* | 3/2020 | Guthmann | H04L 5/0055 |
| 2020/0344722 A1* | 10/2020 | He | H04W 72/0446 |
| 2020/0374857 A1* | 11/2020 | Zeng | H04W 68/005 |
| 2021/0037549 A1* | 2/2021 | Akkarakaran | H04W 72/1247 |

FOREIGN PATENT DOCUMENTS

| | | |
|---|---|---|
| WO | 2020033226 | 2/2020 |
| WO | 2020044310 | 3/2020 |

OTHER PUBLICATIONS

European Search Report in corresponding EP Application No. 20188034.1, dated Jan. 19, 2021.

Sequans Communications, "Discussion on paging relay and sidelink maintenance", 3GPP Draft; R2-1703593, Discussion on Paging Relay and Sidelink Maintenance, 3rd Generation Partnership Project (3GPP), Mobile Competence Centre; 650, Route Des Lucioles; F-06921 Sophia-Antipolis C vol., Ran WG2, No. Spkane, USA; Apr. 3, 2017-Apr. 7, 2017, Apr. 3, 2017. XP051245432.

Huawei et al, "Some Considerations about DRX on PC5", 3GPP Draft; R2-1704718 Some Considerations about DRX on PC5, 3rd Generation Partnership Project (3GPP), Mobile Competence Centre; 650, Route Des Lucioles; F-06921 Sophia-Antipolis Cedex; France, vol., RAN WG2, No. Hangzhou, China; May 15, 2017-May 19, 2017, May 14, 2017, XP051275256.

Inte Corporation, ITL, "Discontinuous Reception over SL", Discussion on decision, 3GPP Draft; R2-1703502, 3GPP TSG RAN WG2 #97bis, Spokane, USA, Apr. 3-7, 2017.

* cited by examiner

| DCI format | Search Space |
|---|---|
| DCI format 5A | For PDCCH: Common and UE specific by C-RNTI |
| | For EPDCCH: UE specific by C-RNTI |

FIG. 5 (PRIOR ART)

| DCI format | Search Space |
|---|---|
| DCI format 5A | For PDCCH: Common and UE specific by C-RNTI |
| | For EPDCCH: UE specific by C-RNTI |

FIG. 6 (PRIOR ART)

| SL index field in DCI format 5A | Indicated value $m$ |
|---|---|
| '00' | 0 |
| '01' | 1 |
| '10' | 2 |
| '11' | 3 |

FIG. 7 (PRIOR ART)

| Resource reservation field in SCI format 1 | Indicated value X | Condition |
|---|---|---|
| '0001', '0010', ..., '1010' | Decimal equivalent of the field | The higher layer decides to keep the resource for the transmission of the next transport block and the value X meets $1 \leq X \leq 10$. |
| '1011' | 0.5 | The higher layer decides to keep the resource for the transmission of the next transport block and the value X is 0.5. |
| '1100' | 0.2 | The higher layer decides to keep the resource for the transmission of the next transport block and the value X is 0.2. |
| '0000' | 0 | The higher layer decides not to keep the resource for the transmission of the next transport block. |
| '1101', '1110', '1111' | Reserved | |

FIG. 8 (PRIOR ART)

| $\mu$ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

FIG. 9 (PRIOR ART)

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 10 (PRIOR ART)

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

FIG. 11 (PRIOR ART)

METHOD AND APPARATUS FOR PROVIDING POWER SAVING OF MONITORING FOR DEVICE-TO-DEVICE COMMUNICATION IN A WIRELESS COMMUNICATION SYSTEM

CROSS-REFERENCE TO RELATED APPLICATIONS

The present Application claims the benefit of U.S. Provisional Patent Application Ser. No. 62/881,571 filed on Aug. 1, 2019, the entire disclosure of which is incorporated herein in its entirety by reference.

FIELD

This disclosure generally relates to wireless communication networks, and more particularly, to a method and apparatus for providing power saving of monitoring for device-to-device communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a second User Equipment (UE) for performing sidelink communication. In one embodiment, the method includes the second UE being (pre-)configured with a sidelink resource pool in a carrier or cell, wherein a DRX (Discontinuous Reception) pattern is associated to the sidelink resource pool. The method also includes the second UE selecting a resource in the sidelink resource pool based on the DRX pattern, wherein a specific message becomes available for transmission in the second UE. The method further includes the second UE transmitting the specific message on the resource to a plurality of UEs comprising at least a first UE.

BRIEF DESCRIPTION OF THE DRAWINGS

FIG. 5 is a reproduction of Table 14.2-1 of 3GPP TS 36.213 V15.3.0.

FIG. 6 is a reproduction of Table 14.2-2 of 3GPP TS 36.213 V15.3.0.

FIG. 7 is a reproduction of Table 14.2.1-1 of 3GPP TS 36.213 V15.3.0.

FIG. 8 is a reproduction of Table 14.2.1-2 of 3GPP TS 36.213 V15.3.0.

FIG. 9 is a reproduction of Table 4.2-1 of 3GPP TS 38.211 V15.5.0.

FIG. 10 is a reproduction of Table 4.3.2-1 of 3GPP TS 38.211 V15.5.0.

FIG. 11 is a reproduction of Table 4.3.2-2 of 3GPP TS 38.211 V15.5.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.213 V15.3.0 (2018-09), "E-UTRA; Physical layer procedures (Release 15)"; TS 36.212 V15.2.1 (2018-07), "E-UTRA; Multiplexing and channel coding (Release 15)"; TS 36.211 V15.2.0 (2018-06), "E-UTRA; Physical channels and modulation (Release 15)"; R1-1810051, "Final Report of 3GPP TSG RAN WG1 #94 v1.0.0 (Gothenburg, Sweden, 20-24 Aug. 2018)"; R1-1812101, "Final Report of 3GPP TSG RAN WG1 #94bis v1.0.0 (Chengdu, China, 8-12 Oct. 2018)"; Draft Report of 3GPP TSG RAN WG1 #95 v0.1.0 (Spokane, USA, 12-16 Nov. 2018); Draft Report of 3GPP TSG RAN WG1 #AH_1901 v0.1.0 (Taipei, Taiwan, 21-25 Jan. 2019); RP-182111, "Revised SID: Study on NR V2X", LG Electronics; and Draft Report of 3GPP TSG RAN WG1 #96 v0.1.0 (Athens, Greece, 25 Feb.-1 Mar. 2019); R1-1903769, "Feature lead summary #3 for agenda item 7.2.4.1.1 Physical layer structure", LG Electronics; Final Chairman's Note of 3GPP TSG RAN WG1 Meeting #96bis (Xian, China, Apr. 8-12, 2019); TS 38.211 V15.5.0 (2019-03), "NR; Physical channels and modulation (Release 15)"; Draft Report of 3GPP TSG RAN WG1 #97 v0.3.0 (Reno, USA, 13-17 May 2019); and TS 38.321 V15.6.0 (2019-06), "NR; Medium Access Control (MAC) protocol specification (Release 15)". The standards and documents listed above are hereby expressly incorporated by reference in their entirety.

Figure 1:
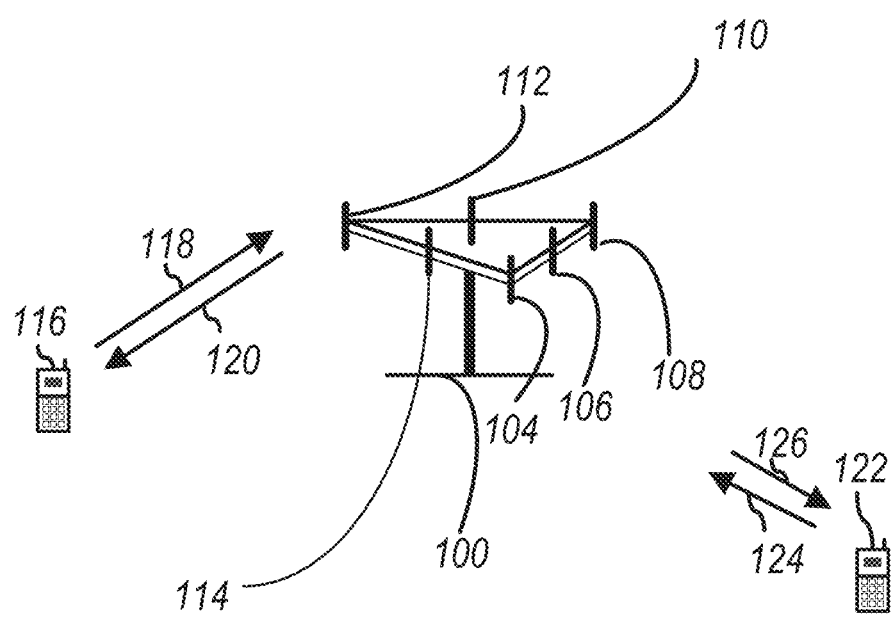
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
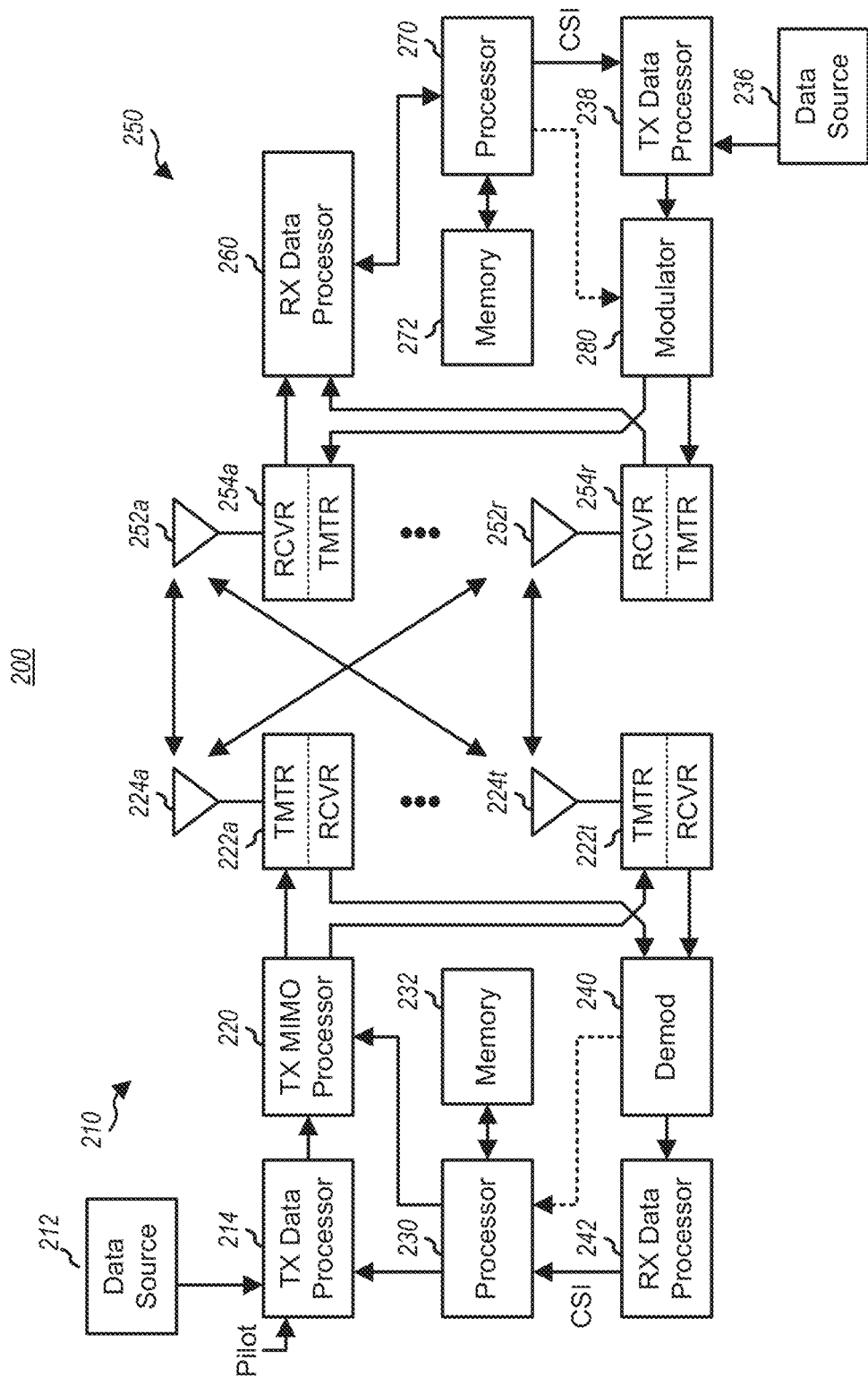
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
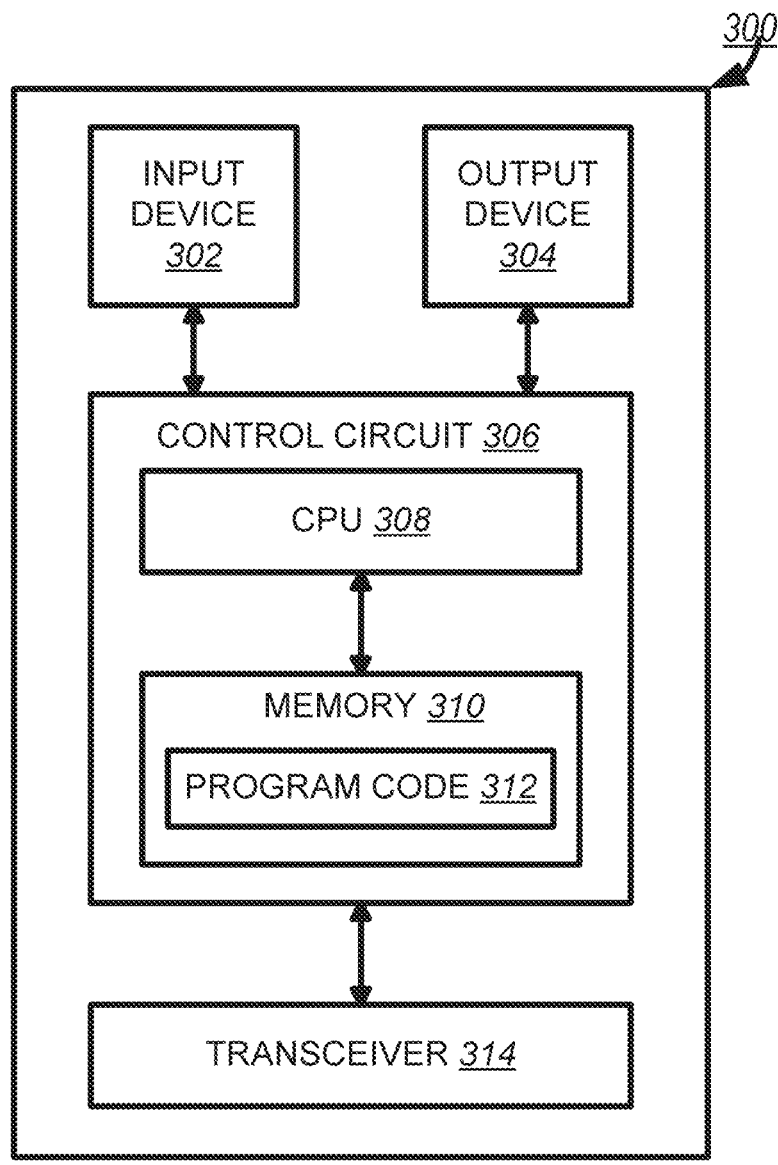
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
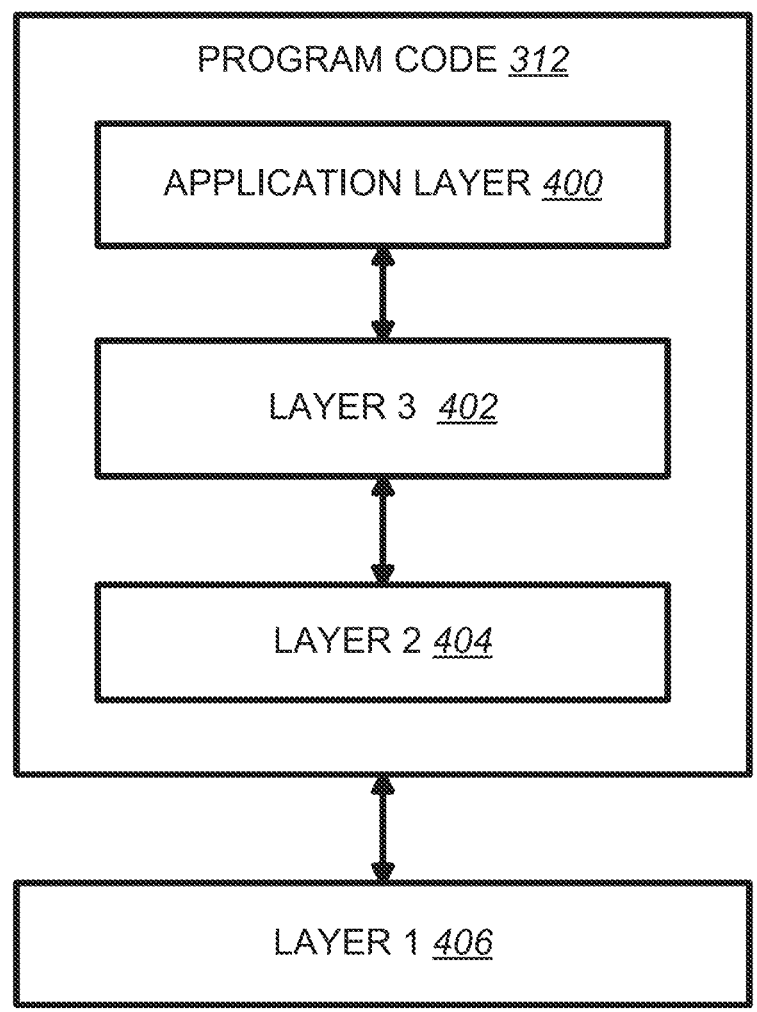
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.213 specifies the UE procedure for V2X transmission. The V2X transmissions are performed as sidelink transmission mode 3 or sidelink transmission mode 4.

14 UE Procedures Related to Sidelink

A UE can be configured by higher layers with one or more PSSCH resource configuration(s). A PSSCH resource configuration can be for reception of PSSCH, or for transmission of PSSCH. The physical sidelink shared channel related procedures are described in Subclause 14.1.

A UE can be configured by higher layers with one or more PSCCH resource configuration(s). A PSCCH resource configuration can be for reception of PSCCH, or for transmission of PSCCH and the PSCCH resource configuration is associated with either sidelink transmission mode 1,2,3 or sidelink transmission mode 4. The physical sidelink control channel related procedures are described in Subclause 14.2.

14.1 Physical Sidelink Shared Channel Related Procedures 14.1.1 UE Procedure for Transmitting the PSSCH If the UE transmits SCI format 1 on PSCCH according to a PSCCH resource configuration in subframe n, then for the corresponding PSSCH transmissions of one TB for sidelink transmission mode 3,
the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.

for sidelink transmission mode 4,
the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.

14.1.1.6 UE Procedure for Determining the Subset of Resources to be Reported to Higher Layers in PSSCH Resource Selection in Sidelink Transmission Mode 4

When requested by higher layers in subframe n, the UE shall determine the set of resources to be reported to higher layers for PSSCH transmission according to the following steps. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers. $C_{resel}$ is determined according to Subclause 14.1.1.4B.

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall assume that any set of $L_{subCH}$ contiguous sub-channels included in the corresponding PSSCH resource pool (described in 14.1.5) within the time interval [n+T$_1$,n+T$_2$] corresponds to one candidate single-subframe resource, where selections of T$_1$ and T$_2$ are up to UE implementations under T$_1$≤4 and 20≤T$_2$≤100. UE selection of T$_2$ shall fulfill the latency requirement. The total number of the candidate single-subframe resources is denoted by $M_{total}$.

2) The UE shall monitor subframes $t_{n'-10 \times P_{step}}^{SL}$, $t_{n'-10 \times P_{step}+1}^{SL}$, . . . , $t_{n'-1}^{SL}$ except for those in which its transmissions occur, where $t_{n'}^{SL}$=n if subframe n belongs to the set ($t_0^{SL}, t_1^{SL}, \ldots, t_{T_{max}}^{SL}$), otherwise subframe $t_{n'}^{SL}$ the first subframe after subframe n belonging to the set ($t_0^{SL}, t_1^{SL}, \ldots, t_{T_{max}}^{SL}$). The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE has not monitored subframe $t_z^{SL}$ in Step 2.

there is an integer j which meets $y+j\times P'_{rsvp\_TX}=z+P_{step}\times k\times q$ where j=0, 1, . . . , $C_{resel}$−1, $P'_{rsvp\_TX}=P_{step}\times P_{rsvp\_TX}/100$, k is any value allowed by the higher layer parameter restrictResourceReservationPeriod and q=1, 2, . . . , Q. Here, Q=1/k if k<1 and $n'-z \leq P_{step}\times k$, where $t_{n'}^{SL}=n$ if subframe n belongs to the set $t_0^{SL}, t_1^{SL}, \ldots, t_{T_{max}}^{SL}$, otherwise subframe $t_{n'}^{SL}$ is the first subframe belonging to the set $t_0^{SL}, t_1^{SL}, t_{T_{max}}^{SL}$ after subframe n; and Q=1 otherwise.

6) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.

PSSCH-RSRP measurement according to the received SCI format 1 is higher than $Th_{prio_{TX}, prio_{RX}}$.

the SCI format received in subframe $t_m^{SL}$ or the same SCI form·at 1 which is assumed to be received in subframe(s) $t_{m+q\times P_{step}\times P_{rsvp\_RX}}^{SL}$ determines according to 14.1.1.4C the set of resource blocks and subframes which overlaps with $R_{x,y+j\times P'_{rsvp\_TX}}$ for q=1, 2, . . . , Q and j=0, 1, . . . , $C_{reset}$−1. Here, $$Q = \frac{1}{P_{rsvp\_RX}} \text{ if } P_{rsvp\_RX} < 1 \text{ and } n' - m \leq P_{step} \times P_{rsvp\_RX},$$

where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$; otherwise Q=1.

7) If the number of candidate single-subframe resources remaining in the set $S_A$ is smaller than $0.2\cdot M_{total}$, then Step 4 is repeated with $Th_{a,b}$ increased by 3 dB.

8) For a candidate single-subframe resource remaining in the set $S_A$, the metric $E_{x,y}$ is defined as the linear average of S-RSSI measured in sub-channels x+k for k=0, . . . , $L_{subCH}$−1 in the monitored subframes in Step 2 that can be expressed by $t_{y-P_{step}*j}^{SL}$ for a non-negative integer j if $P_{rsvp\_TX} \geq 100$, and $$t_{y-P'_{rsvp\_TX}*j}^{SL}$$

for a non-negative integer j otherwise.

9) The UE moves the candidate single-subframe resource $R_{x,y}$ with the smallest metric $E_{x,y}$ from the set $S_A$ to $S_B$.

This step is repeated until the number of candidate single-subframe resources in the set $S_B$ becomes greater than or equal to $0.2\cdot M_{total}$.

The UE shall report set $S_B$ to higher layers.

[ . . . ]

14.2 Physical Sidelink Control Channel Related Procedures

For sidelink transmission mode 1, if a UE is configured by higher layers to receive DCI format 5 with the CRC scrambled by the SL-RNTI, the UE shall decode the PDCCH/EPDCCH according to the combination defined in Table 14.2-1.

[Table 14.2-1 of 3GPP TS 36.213 V15.3.0, entitled "PDCCH/EPDCCH configured by SL-RNTI", is reproduced as FIG. 5]

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

[Table 14.2-2 of 3GPP TS 36.213 V15.3.0, entitled "PDCCH/EPDCCH configured by SL-V-RNTI or SL-SPS-V-RNTI", is reproduced as FIG. 6]

The carrier indicator field value in DCI format 5A corresponds to v2x-InterFreqInfo.

[ . . . ]

14.2.1 UE Procedure for Transmitting the PSCCH

For sidelink transmission mode 3,

The UE shall determine the subframes and resource blocks for transmitting SCI format 1 as follows:

SCI format 1 is transmitted in two physical resource blocks per slot in each subframe where the corresponding PSSCH is transmitted.

If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3} \cdot L_{init}$$

is the value indicated by "Lowest index of the sub-channel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init}\cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3} \cdot L_{init}$$

is the value indicated by "Lowest index of the subchannel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k \cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

The UE shall set the contents of the SCI format 1 as follows:
  the UE shall set the Modulation and coding scheme as indicated by higher layers.
  the UE shall set the "Priority" field according to the highest priority among those priority(s) indicated by higher layers corresponding to the transport block.
  the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
  the UE shall set the Resource reservation according to table 14.2.1-2 based on indicated value X, where X is equal to the Resource reservation interval provided by higher layers divided by 100.
  Each transmission of SCI format 1 is transmitted in one subframe and two physical resource blocks per slot of the subframe.
  The UE shall randomly select the cyclic shift $n_{cs,\lambda}$ among $\{0, 3, 6, 9\}$ in each PSCCH transmission.

For sidelink transmission mode 4,
  The UE shall determine the subframes and resource blocks for transmitting SCI format 1 as follows:
    SCI format 1 is transmitted in two physical resource blocks per slot in each subframe where the corresponding PSSCH is transmitted.
  If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.
  If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$ where $SF_{gap}$ is the value indicated by "Time gap between initial transmission and retransmission" field in the configured sidelink grant, $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.
  the UE shall set the contents of the SCI format 1 as follows:
    the UE shall set the Modulation and coding scheme as indicated by higher layers.
    the UE shall set the "Priority" field according to the highest priority among those priority(s) indicated by higher layers corresponding to the transport block.
    the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
    the UE shall set the Resource reservation field according to table 14.2.1-2 based on indicated value X, where X is equal to the Resource reservation interval provided by higher layers divided by 100.
    Each transmission of SCI format 1 is transmitted in one subframe and two physical resource blocks per slot of the subframe.
    The UE shall randomly select the cyclic shift $n_{cs,\lambda}$ among $\{0, 3, 6, 9\}$ in each PSCCH transmission.

[Table 14.2.1-1 of 3GPP TS 36.213 V15.3.0, entitled "Mapping of DCI format 5A offset field to indicated value m", is reproduced as FIG. 7]

[Table 14.2.1-2 of 3GPP TS 36.213 V15.3.0, entitled "Determination of the Resource reservation field in SCI format 1", is reproduced as FIG. 8]

3GPP TS 36.214 specifies some measurements for sidelink transmission as follows:

5.1.28 Sidelink Received Signal Strength Indicator (S-RSSI)

| | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe. The reference point for the S-RSSI shall be the antenna connector of the UE. If receiver diversity is in use by the UE, the reported value shall not be lower than the corresponding S-RSSI of any of the individual diversity branches |
| Applicable for | RRC_IDLE intra-frequency, RRC_IDLE inter-frequency, RRC_CONNECTED intra-frequency, RRC_CONNECTED inter-frequency |

5.1.29 PSSCH Reference Signal Received Power (PSSCH-RSRP)

| | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH. The reference point for the PSSCH-RSRP shall be the antenna connector of the UE. If receiver diversity is in use by the UE, the reported value shall not be lower than the corresponding PSSCH-RSRP of any of the individual diversity branches |
| Applicable for | RRC_IDLE intra-frequency, RRC_IDLE inter-frequency, RRC_CONNECTED intra-frequency, RRC_CONNECTED inter-frequency |

3GPP TS 36.212 specifies CRC attachment for downlink shared channel and downlink control information. The downlink shared channel and downlink control information are for communication between network node and UE, i.e. Uu link.

5.3.3.1.9A Format 5A

DCI format 5A is used for the scheduling of PSCCH, and also contains several SCI format 1 fields used for the scheduling of PSSCH.

The following information is transmitted by means of the DCI format 5A:

- Carrier indicator—3 bits. This field is present according to the definitions in [3].
- Lowest index of the subchannel allocation to the initial transmission—$\lceil \log_2(N_{subchannel}^{SL}) \rceil$ bits as defined in subclause 14.1.1.4C of [3].
- SCI format 1 fields according to 5.4.3.1.2:
  - Frequency resource location of initial transmission and retransmission.
  - Time gap between initial transmission and retransmission.
  - SL index—2 bits as defined in subclause 14.2.1 of [3] (this field is present only for cases with TDD operation with uplink-downlink configuration 0-6).

When the format 5A CRC is scrambled with SL-SPS-V-RNTI, the following fields are present:

- SL SPS configuration index—3 bits as defined in subclause 14.2.1 of [3].
- Activation/release indication—1 bit as defined in subclause 14.2.1 of [3].

3GPP TS 36.212 also specifies CRC attachment for sidelink shared channel and sidelink control information. The sidelink shared channel and sidelink control information are for communication between devices, i.e. PC5 link or device-to-device link.

5.4.3.1.2 SCI format 1

SCI format 1 is used for the scheduling of PSSCH.

The following information is transmitted by means of the SCI format 1:

- Priority—3 bits as defined in subclause 4.4.5.1 of [7].
- Resource reservation—4 bits as defined in subclause 14.2.1 of [3].
- Frequency resource location of initial transmission and retransmission—$\lceil \log_2(N_{subchannel}^{SL}(N_{subchannel}^{SL}+1)/2) \rceil$ bits as defined in subclause 14.1.1.4C of [3].
- Time gap between initial transmission and retransmission—4 bits as defined in subclause 14.1.1.4C of [3].
- Modulation and coding scheme—5 bits as defined in subclause 14.2.1 of [3].
- Retransmission index—1 bit as defined in subclause 14.2.1 of [3].
- Transmission format—1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.
- Reserved information bits are added until the size of SCI format 1 is equal to 32 bits. The reserved bits are set to zero.

3GPP TS 36.211 also specifies generation for physical sidelink shared channel and physical sidelink control channel. The physical sidelink shared channel and physical sidelink control channel are for communication between devices, i.e. PC5 link or device-to-device link. The physical sidelink shared channel (PSSCH) delivers data/transport block for sidelink shared channel (SL-SCH). The physical sidelink control channel (PSCCH) delivers sidelink control information (SCI).

9.1.1 Physical Channels

A sidelink physical channel corresponds to a set of resource elements carrying information originating from higher layers and is the interface defined between 3GPP TS 36.212 [3] and the present document 3GPP TS 36.211. The following sidelink physical channels are defined:

Physical Sidelink Shared Channel, PSSCH
Physical Sidelink Control Channel, PSCCH
Physical Sidelink Broadcast Channel, PSBCH Generation of the baseband signal representing the different physical sidelink channels is illustrated in FIG. 5.3-1.

3GPP RP-182111 specifies the Justification and objective of study item on NR V2X.

3 Justification

SA1 has identified 25 use cases for advanced V2X services and they are categorized into four use case groups: vehicles platooning, extended sensors, advanced driving and remote driving. The detailed description of each use case group is provided as below.

Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

Advanced Driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

In RAN1 #94 meeting (as captured in 3GPP R1-1810051), RAN1 has some agreements about NR V2X as follows:
Agreements:
  RAN1 assumes that higher layer decides if a certain data has to be transmitted in a unicast, groupcast, or broadcast manner and inform the physical layer of the decision. For a transmission for unicast or groupcast, RAN1 assumes that the UE has established the session to which the transmission belongs to. Note that RAN1 has not made agreement about the difference among transmissions in unicast, groupcast, and broadcast manner.
  RAN1 assumes that the physical layer knows the following information for a certain transmission belonging to a unicast or groupcast session. Note RAN1 has not made agreement about the usage of this information.
    ID
      Groupcast: destination group ID
      Unicast: destination ID
    HARQ process ID
Agreements:
  At least PSCCH and PSSCH are defined for NR V2X.
    PSCCH at least carries information necessary to decode PSSCH.
Agreements:
RAN1 to continue study on multiplexing physical channels considering at least the above aspects:
  Multiplexing of PSCCH and the associated PSSCH (here, the "associated" means that the PSCCH at least carries information necessary to decode the PSSCH).
    Study further the following options:
      Option 1: PSCCH and the associated PSSCH are transmitted using non-overlapping time resources.
      Option 1A: The frequency resources used by the two channels are the same.
      Option 1B: The frequency resources used by the two channels can be different.
      Option 2: PSCCH and the associated PSSCH are transmitted using non-overlapping frequency resources in the all the time resources used for transmission. The time resources used by the two channels are the same.
      Option 3: A part of PSCCH and the associated PSSCH are transmitted using overlapping time resources in non-overlapping frequency resources, but another part of the associated PSSCH and/or another part of the PSCCH are transmitted using non-overlapping time resources.
[ . . . ]
Agreements:
  At least two sidelink resource allocation modes are defined for NR-V2X sidelink communication
    Mode 1: Base station schedules sidelink resource(s) to be used by UE for sidelink transmission(s)
    Mode 2: UE determines (i.e. base station does not schedule) sidelink transmission resource(s) within sidelink resources configured by base station/network or pre-configured sidelink resources
In RAN1 #94bis meeting (as captured in 3GPP R1-1812101), RAN1 has some agreements about NR V2X as follows:
Agreements:
  Layer-1 destination ID is conveyed via PSCCH.
  Additional Layer-1 ID(s) is conveyed via PSCCH at least for the purpose of identifying which transmissions can be combined in reception when HARQ feedback is in use.
Agreements:
  For unicast, sidelink HARQ feedback and HARQ combining in the physical layer are supported.
  For groupcast, sidelink HARQ feedback and HARQ combining in the physical layer are supported.
Agreements:
For PSCCH and associated PSSCH multiplexing
  At least one of Option 1A, 1B, and 3 is supported.
R1-1812017
Agreements:
  Sidelink control information (SCI) is defined.
    SCI is transmitted in PSCCH.
    SCI includes at least one SCI format which includes the information necessary to decode the corresponding PSSCH.
    NDI, if defined, is a part of SCI.
  Sidelink feedback control information (SFCI) is defined.
    SFCI includes at least one SFCI format which includes HARQ-ACK for the corresponding PSSCH.
Agreements:
  At least resource pool is supported for NR sidelink
    Resource pool is a set of time and frequency resources that can be used for sidelink transmission and/or reception.
    A resource pool is inside the RF bandwidth of the UE.
    UE assumes a single numerology in using a resource pool.
    Multiple resource pools can be configured to a single UE in a given carrier.
In RAN1 #95 meeting (as captured in the Draft Report of 3GPP TSG RAN WG1 #95 V0.1.0), RAN1 has some agreements about NR V2X as follows:
Working assumption:
  Regarding PSCCH/PSSCH multiplexing, at least option 3 is supported for CP-OFDM.
    RAN1 assumes that transient period is not needed between symbols containing PSCCH and symbols not containing PSCCH in the supported design of option 3.
Agreements:
Physical sidelink feedback channel (PSFCH) is defined and it is supported to convey SFCI for unicast and groupcast via PSFCH.
Agreements:
  When SL HARQ feedback is enabled for unicast, the following operation is supported for the non-CBG case:
    Receiver UE generates HARQ-ACK if it successfully decodes the corresponding TB. It generates HARQ-NACK if it does not successfully decode the corresponding TB after decoding the associated PSCCH which targets the receiver UE.
Agreements:
  When SL HARQ feedback is enabled for groupcast, the following operations are further studied for the non-CBG case:
    Option 1: Receiver UE transmits HARQ-NACK on PSFCH if it fails to decode the corresponding TB after decoding the associated PSCCH. It transmits no signal on PSFCH otherwise.
    Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE. Details are FFS including the following:

Agreements:
It is supported to enable and disable SL HARQ feedback in unicast and groupcast.

In RAN1 #AH1901 meeting (as captured in the Draft Report of 3GPP TSG RAN WG1 #AH1901 V0.1.0), RAN1 has some agreements about NR V2X.

Agreements:
For time domain resources of a resource pool for PSSCH,
Support the case where the resource pool consists of non-contiguous time resources
For frequency domain resources of a resource pool for PSSCH,
Down select following options:
Option 1: The resource pool always consists of contiguous PRBs
Option 2: The resource pool can consist of non-contiguous PRBs Agreements:
Layer-1 destination ID can be explicitly included in SCI
The following additional information can be included in SCI
Layer-1 source ID
HARQ process ID
New Data Indicator (NDI)
Redundancy Version (RV)

Agreements:
For determining the resource of PSFCH containing HARQ feedback, support that the time gap between PSSCH and the associated PSFCH is not signaled via PSCCH at least for modes 2(a)(c)(d) (if respectively supported)

Working assumption:
When HARQ feedback is enabled for groupcast, support (options as identified in RAN1#95):
Option 1: Receiver UE transmits only HARQ NACK
Option 2: Receiver UE transmits HARQ ACK/NACK Agreements:
It is supported that in mode 1 for unicast, the in-coverage UE sends an indication to gNB to indicate the need for retransmission
At least PUCCH is used to report the information
The gNB can also schedule re-transmission resource Agreements:
(Pre-)configuration indicates whether SL HARQ feedback is enabled or disabled in unicast and/or groupcast.

Agreements:
Mode-2 supports the sensing and resource (re-)selection procedures according to the previously agreed definitions.

Agreements:
Sub-channel based resource allocation is supported for PSSCH

Agreements:
SCI decoding applied during sensing procedure provides at least information on sidelink resources indicated by the UE transmitting the SCI In RAN1 #96 meeting (as captured in the Draft Report of 3GPP TSG RAN WG1 #96 V0.1.0), the following agreements were reached for (V2X) sidelink transmission:

Agreements:
At least for sidelink HARQ feedback, NR sidelink supports at least a PSFCH format which uses last symbol(s) available for sidelink in a slot.

Agreements:
(Pre-)configuration indicates the time gap between PSFCH and the associated PSSCH for Mode 1 and Mode 2.

Agreements:
For sidelink groupcast, it is supported to use TX-RX distance and/or RSRP in deciding whether to send HARQ feedback.
This feature can be disabled/enabled Agreements:
Blind retransmissions of a TB are supported for SL by NR-V2X Agreements:
NR V2X Mode-2 supports reservation of sidelink resources at least for blind retransmission of a TB Agreements:
Mode-2 sensing procedure utilizes the following sidelink measurement
L1 SL-RSRP based on sidelink DMRS when the corresponding SCI is decoded In 3GPP R1-1903769, two proposals related to two stages SCI are provided below:

Proposals:
RAN1 has studied the following proposal, and has concluded that it may be beneficial if the size of control information for groupcast and/or unicast
can vary substantially, or
is sufficiently larger than the size of control information for broadcast:
For decoding a PSSCH,
A UE receives an SCI decoded/detected by all the UEs:
This SCI includes at least the following:
Information necessary to receive the other SCI described below (if/when needed).
All the information necessary to receive broadcast transmissions.
Information used for sensing
This SCI is received based on blind detection/decoding.
The UE may receive another SCI carries the remaining information to be decoded only the target UEs.
Receiving this SCI does not require blind detection/decoding.

Proposed 2-stage SCI description:
1st-stage SCI carries the information at least for sensing and broadcast communication to be decoded by any UE.
1st-stage SCI is carried in PSCCH with the single payload size for unicast/groupcast/broadcast and the fixed resource size.
2nd-stage SCI carries the remaining information to be decoded only the target UEs.
Information to decode 2nd-stage SCI is derived based on information carried in 1st-stage SCI.

The Final Chairman's Note of 3GPP TSG RAN WG1 Meeting #96bis states:

Agreements:
The starting symbol and the number of symbols for a PSCCH are assumed to be known to the receiving UE before decoding the PSCCH.

Agreements:
For the purpose of evaluation of PSCCH design, RAN1 assumes 60 bits, 90 bits, 120 bits as the total SCI sizes including 24 bits CRC.
Other sizes are not precluded.

Agreements:
  A dynamic grant provides resources for one or multiple sidelink transmissions of a single TB.
  A configured grant (type-1, type-2) provides a set of resources in a periodic manner for multiple sidelink transmissions.
    UE decides which TB to transmit in each of the occasions indicated by a given configured grant.
Agreements:
  NR V2X supports an initial transmission of a TB without reservation, based on sensing and resource selection procedure
  NR V2X supports reservation of a sidelink resource for an initial transmission of a TB at least by an SCI associated with a different TB, based on sensing and resource selection procedure
    This functionality can be enabled/disabled by (pre-)configuration
Agreements:
  Confirm the following working assumption:
    Working assumption:
      When HARQ feedback is enabled for groupcast, support (options as identified in RAN1#95):
        Option 1: Receiver UE transmits only HARQ NACK
        Option 2: Receiver UE transmits HARQ ACK/NACK
Agreements:
  In HARQ feedback for groupcast,
    When Option 1 is used for a groupcast transmission, it is supported
      all the receiver UEs share a PSFCH
    When Option 2 is used for a groupcast transmission, it is supported
      each receiver UE uses a separate PSFCH for HARQACK/NACK.
    Note: Each PSFCH is mapped to a time, frequency, and code resource.
Agreements:
  It is supported, in a resource pool, that within the slots associated with the resource pool, PSFCH resources can be (pre)configured periodically with a period of N slot(s)
    N is configurable, with the following values
      1
      At least one more value >1
    The configuration should also include the possibility of no resource for PSFCH. In this case, HARQ feedback for all transmissions in the resource pool is disabled
  HARQ feedback for transmissions in a resource pool can only be sent on PSFCH in the same resource pool
Agreements:
  Support at least Sidelink CSI-RS for CQI/RI measurement
    Sidelink CSI-RS is confined within the PSSCH transmission
3GPP TS 38.211 states:
4 Frame Structure and Physical Resources
4.1 General
Throughout this specification, unless otherwise noted, the size of various fields in the time domain is expressed in time units $T_c=1/(\Delta f_{max} N_f)$ where $\Delta f_{max}=480 \cdot 10^3$ Hz and $N_f=4096$. The constant $\kappa=T_s/T_c=64$ where $T_s=1/(\Delta f_{ref} N_{f,ref})$, $\Delta f_{ref}=15 \cdot 10^3$ Hz and $N_{f,ref}=2048$.

4.2 Numerologies
Multiple OFDM numerologies are supported as given by Table 4.2-1 where μ and the cyclic prefix for a bandwidth part are obtained from the higher-layer parameter subcarrierSpacing and cyclicPrefix, respectively.
[Table 4.2-1 of 3GPP TS 38.211 V15.5.0, entitled "Supported transmission numerologies", is reproduced as FIG. 9]
4.3.2 Slots
For subcarrier spacing configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot in a subframe is aligned in time with the start of OFDM symbol $n_s \uparrow N_{symb}^{slot}$ in the same subframe.
OFDM symbols in a slot can be classified as 'downlink', 'flexible', or 'uplink'. Signaling of slot formats is described in subclause 11.1 of [5, TS 38.213].
In a slot in a downlink frame, the UE shall assume that downlink transmissions only occur in 'downlink' or 'flexible' symbols.
In a slot in an uplink frame, the UE shall only transmit in 'uplink' or 'flexible' symbols.
A UE not capable of full-duplex communication among a group of cells is not expected to transmit in the uplink in one cell within the group of cells earlier than $N_{Rx-Tx} T_c$ after the end of the last received downlink symbol in the same or different cell within the group of cells where $N_{Rx-Tx}$ is given by Table 4.3.2-3.
A UE not capable of full-duplex communication among a group of cells is not expected to receive in the downlink in one cell within the group of cells earlier than $N_{Tx-Rx} T_c$ after the end of the last transmitted uplink symbol in the same or different cell within the group of cells where $N_{Tx-Rx}$ is given by Table 4.3.2-3.
[Table 4.3.2-1 of 3GPP TS 38.211 V15.5.0, entitled "Number of OFDM symbols per slot, slots per frame, and slots per subframe for normal cyclic prefix", is reproduced as FIG. 10]
[Table 4.3.2-2 of 3GPP TS 38.211 V15.5.0, entitled "Number of OFDM symbols per slot, slots per frame, and slots per subframe for extended cyclic prefix", is reproduced as FIG. 11]
The Draft Report of 3GPP TSG RAN WG1 #97 V0.3.0 states:
Agreements:
  A sequence-based PSFCH format with one symbol (not including AGC training period) is supported.
    This is applicable for unicast and groupcast including options 1/2.
    Sequence of PUCCH format 0 is the starting point.
Agreement:
  Transmission of PSSCH is mapped onto contiguous PRBs only
Agreement:
  Sub-channel size is (pre)configurable.
Agreements:
  Sidelink HARQ ACK/NACK report from transmitter UE to gNB is supported.
Agreement:
  NR sidelink does not support performing different transmissions of a TB using different configured grants.
Agreement:
  For mode 1:
    A dynamic grant by the gNB provides resources for transmission of PSCCH and PSSCH.

Agreements:
   NR V2X Mode-2 supports resource reservation for feedback-based PSSCH retransmissions by signaling associated with a prior transmission of the same TB
      FFS impact on subsequent sensing and resource selection procedures
      At least from the transmitter perspective of this TB, usage of HARQ feedback for release of unused resource(s) is supported
         No additional signaling is defined for the purpose of release of unused resources by the transmitting UE
Agreements:
   RAN1 to further select between the following options of sidelink resource reservation for blind retransmissions:
      Option 1: A transmission can reserve resources for none, one, or more than one blind retransmission
      Option 2: A transmission can reserve resource for none or one blind retransmission
Agreements:
   Resource selection window is defined as a time interval where a UE selects sidelink resources for transmission
      The resource selection window starts T1≥0 after a resource (re-)selection trigger and is bounded by at least a remaining packet delay budget
Agreements:
   Support a sub-channel as the minimum granularity in frequency domain for the sensing for PSSCH resource selection
Agreements:
   For at least option 1 based TX-RX distance-based HARQ feedback for groupcast,
      A UE transmits HARQ feedback for the PSSCH if TX-RX distance is smaller or equal to the communication range requirement. Otherwise, the UE does not transmit HARQ feedback for the PSSCH
      TX UE's location is indicated by SCI associated with the PSSCH.
         Details FFS
      The TX-RX distance is estimated by RX UE based on its own location and TX UE location.
      The used communication range requirement for a PSSCH is known after decoding SCI associated with the PSSCH
Agreement:
   For the period of N slot(s) of PSFCH resource, N=2 and N=4 are additionally supported.
Agreements:
   For a PSSCH transmission with its last symbol in slot n, when the corresponding HARQ feedback is due for transmission, it is expected to be in slot n+a where a is the smallest integer larger than or equal to K with the condition that slot n+a contains PSFCH resources.
Agreements:
   At least for the case when the PSFCH in a slot is in response to a single PSSCH:
      Implicit mechanism is used to determine at least frequency and/or code domain resource of PSFCH, within a configured resource pool. At least the following parameters are used in the implicit mechanism:
         Slot index (FFS details) associated with PSCCH/PSSCH/PSFCH
         Sub-channel(s) (FFS details) associated with PSCCH/PSSCH
         Identifier (FFS details) to distinguish each RX UE in a group for Option 2 groupcast HARQ feedback 3GPP specification 38.321 introduces Discontinuous Reception (DRX) in Uu (e.g. between a UE and a network) as follows:
5.7 Discontinuous Reception (DRX)
The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].
RRC controls DRX operation by configuring the following parameters:
   drx-onDurationTimer: the duration at the beginning of a DRX Cycle;
   drx-SlotOffset: the delay before starting the drx-onDurationTimer;
   drx-InactivityTimer: the duration after the PDCCH occasion in which a PDCCH indicates a new UL or DL transmission for the MAC entity;
   drx-RetransmissionTimerDL (per DL HARQ process except for the broadcast process): the maximum duration until a DL retransmission is received;
   drx-RetransmissionTimerUL (per UL HARQ process): the maximum duration until a grant for UL retransmission is received;
   drx-LongCycleStartOffset: the Long DRX cycle and drx-StartOffset which defines the subframe where the Long and Short DRX Cycle starts;
   drx-ShortCycle (optional): the Short DRX cycle;
   drx-ShortCycleTimer (optional): the duration the UE shall follow the Short DRX cycle;
   drx-HARQ-RTT-TimerDL (per DL HARQ process except for the broadcast process): the minimum duration before a DL assignment for HARQ retransmission is expected by the MAC entity;
   drx-HARQ-RTT-TimerUL (per UL HARQ process): the minimum duration before a UL HARQ retransmission grant is expected by the MAC entity.
When a DRX cycle is configured, the Active Time includes the time while:
   drx-onDurationTimer or drx-InactivityTimer or drx-RetransmissionTimerDL or drx-RetransmissionTimerUL or ra-ContentionResolutionTimer (as described in clause 5.1.5) is running; or
   a Scheduling Request is sent on PUCCH and is pending (as described in clause 5.4.4); or
   a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).
When DRX is configured, the MAC entity shall:
   1> if a MAC PDU is received in a configured downlink assignment:
      2> start the drx-HARQ-RTT-TimerDL for the corresponding HARQ process in the first symbol after the end of the corresponding transmission carrying the DL HARQ feedback;

2> stop the drx-RetransmissionTimerDL for the corresponding HARQ process.
1> if a MAC PDU is transmitted in a configured uplink grant:
2> start the drx-HARQ-RTT-TimerUL for the corresponding HARQ process in the first symbol after the end of the first repetition of the corresponding PUSCH transmission;
2> stop the drx-RetransmissionTimerUL for the corresponding HARQ process.
1> if a drx-HARQ-RTT-TimerDL expires:
2> if the data of the corresponding HARQ process was not successfully decoded:
3> start the drx-RetransmissionTimerDL for the corresponding HARQ process in the first symbol after the expiry of drx-HARQ-RTT-TimerDL.
1> if a drx-HARQ-RTT-TimerUL expires:
2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
2> stop drx-onDurationTimer;
2> stop drx-InactivityTimer.
1> if drx-InactivityTimer expires or a DRX Command MAC CE is received:
2> if the Short DRX cycle is configured:
3> start or restart drx-ShortCycleTimer in the first symbol after the expiry of drx-InactivityTimer or in the first symbol after the end of DRX Command MAC CE reception;
3> use the Short DRX Cycle.
2> else:
3> use the Long DRX cycle.
1> if drx-ShortCycleTimer expires:
2> use the Long DRX cycle.
1> if a Long DRX Command MAC CE is received:
2> stop drx-ShortCycleTimer;
2> use the Long DRX cycle.
1> if the Short DRX Cycle is used, and [(SFN×10)+ subframe number] modulo (drx-ShortCycle)=(drx-StartOffset) modulo (drx-ShortCycle); or
1> if the Long DRX Cycle is used, and [(SFN×10)+ subframe number] modulo (drx-LongCycle)=drx-StartOffset:
2> start drx-onDurationTimer after drx-SlotOffset from the beginning of the subframe.
1> if the MAC entity is in Active Time:
2> monitor the PDCCH as specified in TS 38.213 [6];
2> if the PDCCH indicates a DL transmission:
3> start the drx-HARQ-RTT-TimerDL for the corresponding HARQ process in the first symbol after the end of the corresponding transmission carrying the DL HARQ feedback;
3> stop the drx-RetransmissionTimerDL for the corresponding HARQ process.
2> if the PDCCH indicates a UL transmission:
3> start the drx-HARQ-RTT-TimerUL for the corresponding HARQ process in the first symbol after the end of the first repetition of the corresponding PUSCH transmission;
3> stop the drx-RetransmissionTimerUL for the corresponding HARQ process.
2> if the PDCCH indicates a new transmission (DL or UL):
3> start or restart drx-InactivityTimer in the first symbol after the end of the PDCCH reception.

1> in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
2> not transmit periodic SRS and semi-persistent SRS defined in TS 38.214 [7]. 1> if CSI masking (csi-Mask) is setup by upper layers:
2> in current symbol n, if drx-onDurationTimer would not be running considering grants/assignments/DRX Command MAC CE/Long DRX Command MAC CE received until 4 ms prior to symbol n when evaluating all DRX Active Time conditions as specified in this clause:
3> not report CSI on PUCCH.
1> else:
2> in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
3> not report CSI on PUCCH and semi-persistent CSI on PUSCH.

Regardless of whether the MAC entity is monitoring PDCCH or not, the MAC entity transmits HARQ feedback, aperiodic CSI on PUSCH, and aperiodic SRS defined in TS 38.214 [7] when such is expected.

The MAC entity needs not to monitor the PDCCH if it is not a complete PDCCH occasion (e.g. the Active Time starts or ends in the middle of a PDCCH occasion).

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

Slot: A slot could be a scheduling unit in NR. A slot duration has 14 OFDM symbols.

Mini-slot: A mini-slot is a scheduling unit with duration less than 14 OFDM symbols.

In RAN 84 meeting, NR V2X sidelink enhancements for Rel-17 are proposed. One important feature is power saving of pedestrian or vulnerable UE. Pedestrian or vulnerable UE could be bicycle helmet, wearable device, cellphone, device using sidelink but not a vehicle. Different from vehicle, power saving needs to be concerned for pedestrian or vulnerable UE. Considering LTE V2X sidelink, one legacy enhancement for pedestrian or vulnerable UE is partial sensing. Partial sensing could benefit for resource selection and does not need to use all sensing result to derive candidate resource. However, partial sensing also require pedestrian or vulnerable UE keep sensing. Hence, new scheme or legacy power saving scheme in LTE Uu or NR Uu are considered.

One legacy power saving mechanism in Uu is DRX (Discontinuous Reception). However, it is still vague how to implement DRX in sidelink. Regarding to legacy DRX in Uu, UE may need to monitor PDCCH scrambled with UE-specific RNTI (e.g., C-RNTI, CS-RNTI, SPS-V-RNTI, SL-V-RNTI) in active time (e.g., DRX ON). Considering common PDCCH which is scrambled with cell-specific RNTI (e.g., SI-RNTI, P-RNTI), UE may monitor the common PDCCH based on configuration for the common PDCCH regardless of whether in active time or not. However, for sidelink, most of transmission is safety purpose and is transmitted via broadcast. If legacy DRX in Uu is inherited without modification in sidelink, the power saving gain by implementing DRX may not achieve. In addition, for legacy vehicle UE, how does legacy vehicle UE know when to transmit V2P sidelink transmission such that Pedestrian UE could detect or monitor in active time. Hence, it is necessary to design DRX for pedestrian or vulnerable UE in sidelink.

In present application, V-UE generally represents vehicle UE and P-UE generally represents pedestrian UE. A broadcast sidelink transmission means or replies the transmission is transmitted in a PC5 interface and is with a common destination identity (ID).

Figure 14:
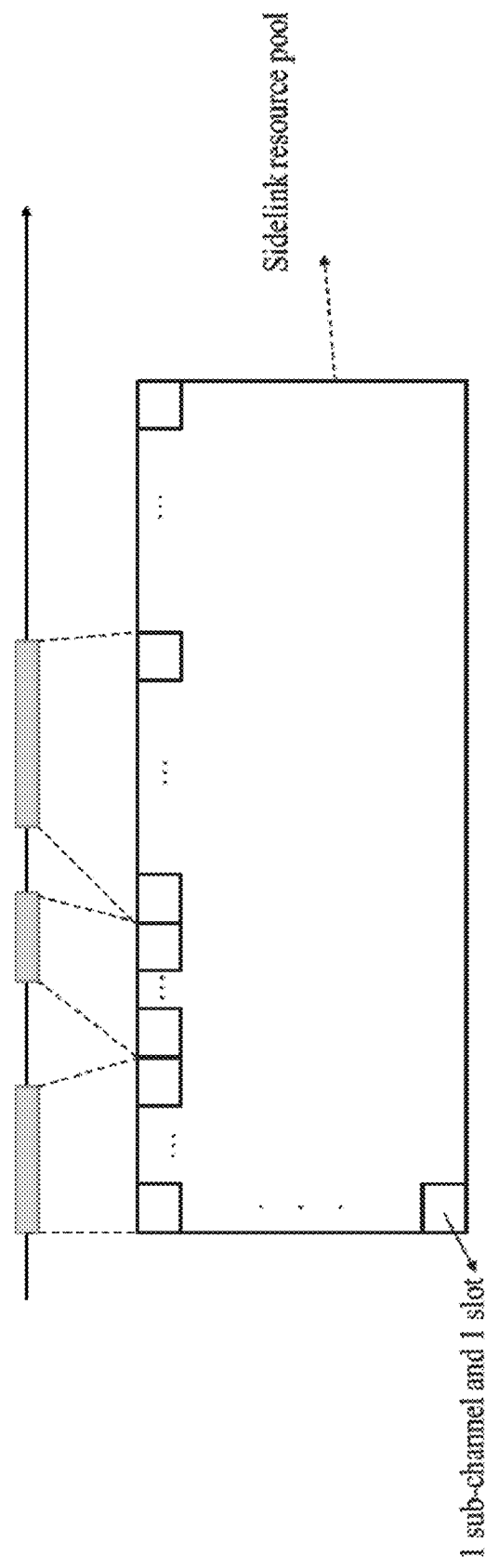
FIG. 14 is a diagram according to one exemplary embodiment.

In FIG. 14, a sidelink resource pool could be illustrated. Slots in the sidelink resource pool could be not contiguous. DRX for the sidelink resource pool means a UE (e.g., a pedestrian UE) monitors the sidelink resource pool discontinuously.

First Concept:

A first UE is configured to perform sidelink transmission and/or reception. The first UE could be (pre-)configured with a sidelink resource pool. The sidelink resource pool contains a first set of slot(s) and a second set of slot(s), wherein a slot in the sidelink resource pool could be denoted as sidelink slot index tn, n=0, 1, . . . . In one embodiment, the first set of slots and the second set of slots are in a cycle in the sidelink resource pool. The first UE could be configured or indicated with the cycle in a periodic manner in the sidelink resource pool. A (pre-) configuration of the sidelink resource pool could indicate the cycle (in a periodic manner). If the first UE is a pedestrian UE, the first UE could be activated or indicated to apply the cycle.

In one embodiment, a first slot and a second slot are contiguous in the sidelink resource pool means sidelink slot index of the first slot and the second slot is contiguous in the sidelink resource pool (e.g., $t_n$ and $t_{n+1}$). The first set of slot could be indicated by a bit-map (during the cycle). The first set of slot is contiguously (in a cycle) in the sidelink resource pool (e.g., $t_n, t_{n+1}, \ldots, t_{n+k}$ considering cardinality of the first set of slot is k+1). The first UE could be (pre-)configured and/or indicated with the first set of slot.

In one embodiment, cardinality of the first set of slot could be DRX ON duration of the first UE in the sidelink resource pool. Furthermore, cardinality of the first set of slot could be an amount of slots in active time. The first UE could perform monitoring or sensing in the sidelink resource pool in the first set of slots. Cardinality of the first set of slot could be determined based on traffic load, zone, environment, speed of vehicle UEs, number of vehicle UEs. Cardinality of the first set of slot could be dynamically changed by a specific signal. In one embodiment, the specific signal could be transmitted via sidelink from a Road side unit (RSU) or via downlink from a network. The specific signal could be a SCI (Sidelink Control Information), DCI (Downlink Control Information), PDSCH (Physical Downlink Shared Channel), PSSCH (Physical Sidelink Shared Channel), MAC CE, MAC PDU (Protocol Data Unit), or RRC (Radio Resource Control) signaling.

In one embodiment, the first UE, before receiving a (updated) specific signal, derives the first set of slots and/or the second set of slots based on the (pre-) configuration of the sidelink resource pool. The specific signal may indicate an absolute value of DRX ON duration or cardinality of the first set of slots. The specific signal may also indicate a positive or negative value of DRX ON duration or cardinality of the first set of slots to adjust current DRX ON duration or current cardinality of the first set of slots.

In one embodiment, the first UE could apply the indication of the specific signal on next (periodic) cycle. Cardinality of the first set of slot could be changed due to one or more timers. The one or more timers could indicate one or more slots for the first UE to wake up to monitor the sidelink resource pool. The one or more timers could also start based on (pre-) configured parameters. Furthermore, the one or more timers could start in a periodic manner. In addition, the one or more timers could start based on event trigger (e.g., the first UE is indicated a reserved resource in a slot by another UE which is in the second set of slot (originally)).

In one embodiment, the first UE could perform sidelink transmission regardless of in the first set of slots or in the second set of slots. Alternatively, the first UE could perform sidelink transmission regardless of in the first set of slots or in the second set of slots, wherein the sidelink transmission is P2V transmission for vehicle UE. The first UE could also perform sidelink transmission limited in the first set of slots, not in the second set of slots, wherein the sidelink transmission is P2P transmission for pedestrian UE.

In one embodiment, the first UE could monitor or sense (sidelink channels or resource pools) in the first set of slot(s). The first UE may not monitor or sense (sidelink channels or resource pools) in the second set of slot(s). In one embodiment, the first UE may not monitor or sense (sidelink channels or resource pools) in the second set of slot(s) without receiving indication or signal. For example, if the first UE receives a signal (e.g., SCI or SL data from a second UE) in a slot among the first set of slot(s), wherein the signal indicates a reserved resource in a slot among the second set of slot(s) (e.g., the second UE would like to reserve resource in the slot), the first UE may wake up, monitor, sense, or receive (sidelink channels) in the slot among the second set of slot(s). Alternatively, the first UE could ignore the reserved resource indicated by the signal. The first UE may not wake up, monitor, sense, or receive (sidelink channels or resource pools) in the slot among the second set of slot(s).

In one embodiment, a second UE could be configured to perform sidelink transmission and/or reception. The second UE could be (pre-)configured with the sidelink resource pool. The second UE could perform sidelink transmission to the first UE in the sidelink resource pool. The second UE could also perform monitoring or sensing sidelink resources in the sidelink resource pool regardless of in the first set of slots or in the second set of slots.

In one embodiment, when the second UE transmits a sidelink broadcast transmission for a TB (Transport Block), the second UE may be required to select at least a resource in a slot among the first set of slots. The TB could deliver V2P (Vehicle-to-Pedestrian) messages. The TB could deliver V2X (Vehicle-to-Everything) messages, which can be utilized by or received for pedestrian UE. The resource could be an initial or new transmission of the TB or retransmission of the TB.

In one embodiment, the first UE may not perform combining the resource and a second resource for the TB received in a slot among the second set of slots. The second UE could prioritize resource(s) in the first set of slots over the resource(s) in the second set of slots. In other words, considering a first candidate resource in the first set of slots and a second candidate resource in the second set of slots (which both meets latency requirement), the second UE could prioritize to select the first candidate resource. In one embodiment, PHY layer of the second UE could indicate MAC layer or higher layer of the second UE that a first number of candidate resource in the first set of slots. Additionally, PHY layer of the second UE could indicate MAC layer or higher layer of the second UE that a second number of candidate resource in the second set of slots.

In one embodiment, MAC layer could first select a candidate resource for the TB, wherein the candidate resource is selected from the first number of candidate resource in the first set of slots. Alternatively, PHY layer of the second UE could indicate a first number of candidate resource(s) regardless of in the first set or the second set. Furthermore, MAC layer of the second UE could prioritize to select resource(s) in the first set. For example, if the second UE is required to select two candidate resources for a TB, the second UE could select a first candidate resource in the first set of slots followed by selecting a second candidate resource in the second set of slots.

In one embodiment, the prioritization of resource selection may be performed for delivering V2P message or V2X message, which can be utilized for or received by pedestrian UE. The prioritization of resource selection may be performed for sidelink broadcast transmission. The prioritization of resource selection may not be performed for delivering V2V message or V2X message, which cannot be utilized by or received for pedestrian UE. The prioritization of resource selection may not be performed for sidelink unicast or groupcast transmission.

In one embodiment, the first UE could be (pre-)configured with a second sidelink resource pool. The second sidelink resource pool and the sidelink resource pool could be (pre-)configured in a carrier. The second sidelink resource pool and the sidelink resource pool could be characterized with a same first set of slots. In one embodiment, it could be beneficial for the first UE to wake up for monitoring or sensing the sidelink resource pool and the second sidelink resource pool in the same time. The sidelink resource pool could be at least partially or fully overlapped in time domain with the second sidelink resource pool. For the overlapped slot, the sidelink resource pool may contain frequency resource which is at least overlapped or non-overlapped with frequency resource contained by the second sidelink resource pool.

In one embodiment, a first UE could be (pre-)configured with a (sidelink) resource pool in a carrier or cell for sidelink transmission. The first UE could be indicated or configured with a cycle in a periodic manner in the resource pool. The cycle may contain a first duration and a second duration. In one embodiment, the first duration could be a subset of the first set of slots in the sidelink resource pool. The second duration could be a subset of the second set of slots in the sidelink resource pool. In one embodiment, the first UE could receive a signal during a first cycle, wherein the signal indicates the (updated) first duration and/or the (updated) second duration in a second cycle. The first UE, in the second cycle, could perform monitoring or receiving sidelink transmission in the (updated) first duration, and may not perform monitoring or receiving sidelink transmission in the (updated) second duration.

In one embodiment, a second UE could be (pre-)configured with a (sidelink) resource pool in a carrier or cell for sidelink transmission. The second UE could be indicated or configured with a cycle in a periodic manner in the resource pool, wherein the cycle contains a first duration and a second duration. When the second UE transmits a sidelink broadcast transmission for a TB, the second UE could select at least a resource for the TB in a slot, wherein the slot is in the first duration. In one embodiment, the second UE could receive a signal during a first cycle, wherein the signal indicates the (updated) first duration and/or the (updated) second duration in a second cycle.

In one embodiment, the second cycle could be the next cycle after the first UE receiving the signal. The second cycle could be the cycle after the first UE receiving the signal plus a processing time. The beginning or beginning boundary of the second cycle may be after the occasion the first UE receives the signal plus a processing time. In one embodiment, the processing time could be in unit of resource in the sidelink resource pool. The processing time could also be a pool common processing time at least support for all UEs performing sidelink transmission in the sidelink resource pool.

In one embodiment, for the first cycle, the first UE could perform monitoring or sensing sidelink resource in the sidelink resource pool during the first duration. For the first cycle, the first UE may not perform monitoring or sensing sidelink resource in the sidelink resource pool during the second duration. The second UE could perform monitoring or sensing sidelink resource in the sidelink resource pool (regardless of in the first duration of the first cycle or in the second duration of the first cycle). The second UE could derive the first duration and/or the second duration in the second cycle based on the indication by the signal.

In one embodiment, the first duration and/or the second duration in a cycle could be in unit of sidelink resource in the sidelink resource pool or in unit of slot in the sidelink resource pool. The first duration could be DRX ON duration in a cycle. The second duration could be DRX off duration in a cycle.

In one embodiment, the signal could be a SCI, MAC PDU, or RRC message. The signal could be transmitted by a network via downlink or a RSU (Roadside Unit) via sidelink or downlink. The signal could also be transmitted in a periodic manner (which may align the cycle length) and/or in a aperiodic manner (which is event trigger). The signal could be transmitted based on congestion condition (e.g., channel busy ratio, CBR (Channel Busy Ratio)) of the sidelink resource pool or the carrier. Furthermore, the signal could be transmitted based on number of UEs (performing sidelink transmission) in the sidelink resource pool or the carrier. The signal could indicate parameters of (updated) parameters (e.g. drx-onDurationTimer or drx-SlotOffset) of a DRX pattern. The signal could also indicate a DRX pattern overriding or updating current DRX pattern. In one embodiment, the signal could indicate whether to apply parameters (e.g. drx-onDurationTimer or drx-SlotOffset) of a DRX pattern (for next cycle).

In one embodiment, the first UE could apply the indication of the signal when or after the first cycle end. The second UE could be acknowledged that the first UE would apply the indication of the signal when or after the first cycle end.

In one embodiment, the first UE could be a pedestrian UE. The first UE may be concerned about power saving. The second UE may not be a pedestrian UE. The second UE may not be concerned about power saving.

Second Concept:

A first UE could be configured to perform sidelink transmission and/or reception. The first UE could be (pre-)configured with a sidelink resource pool. The first UE could be configured or indicated a first duration (e.g., P1) and a second duration (e.g., P2). The first duration and/or the second duration is in unit of slot in the sidelink resource pool. A slot in the sidelink resource pool could be denoted as sidelink slot index tn, n=0, 1, . . . .

In one embodiment, the first duration and/or the second duration could be configured per sidelink resource pool, per zone, or per UE. The first UE could be configured with a cycle or period in a periodic manner. The cycle or period may comprise the first duration and the second duration in time domain in the sidelink resource pool. The cycle or period may comprise the first duration and the second duration in time domain in the sidelink resource pool. The first duration and the second duration may be non-overlapped in time domain in the sidelink resource pool.

The first UE could perform sidelink discovery, sensing, or monitoring within the first duration. In other words, the first UE could wake up, monitor, or sense the sidelink resource pool in sometime or during the first duration (which the sometime or the first duration could be (pre-)configured in a periodic manner). The first UE could derive or detect the traffic condition, channel condition, congestion condition, environment, or speed of surrounding UEs. In one embodiment, sensing, monitoring, or wake up in sometimes or in the first duration could assist the first UE to derive when to wake up after the first duration or in the future. The first UE could identify nearby UE's broadcast pattern. The first UE may not apply DRX operation or procedure within the first duration. The first UE may apply DRX operation or procedure within the second duration. The first UE could derive a DRX pattern within the second duration. In one embodiment, if nearby UE's broadcast pattern indicates more reserved resource in the second duration of the first UE, the first UE could derive the DRX pattern with more active time for monitoring, wake up, or sensing. The first UE could derive the DRX pattern within the second duration based on (channel busy ratio) CBR derived in the first duration. In one embodiment, considering the sidelink resource pool is congested, the first UE could derive the DRX pattern in the second duration as more time for monitoring, wake up, sensing, or in activity.

In one embodiment, the second duration may comprise a first set of slot(s) and a second set of slot(s). The value of the second duration may be equal to cardinality of the first set of slots and cardinality of the second set of slots. The DRX pattern could indicate when the first UE wakes up and sleep. The DRX pattern could indicate that the first UE monitor or sense in the first set of slots, and may not monitor or sense in the second set of slots. In one embodiment, cardinality of the first set of slots could be derived from the first duration. The first set of slots may at least comprise (reserved) resource indicated by signal received in the first duration. The first set of slot could be contiguously in the sidelink resource pool (e.g., $t_n$, $t_{n+1}$, ... $t_{n+k}$ considering cardinality of the first set of slot is k+1).

Alternatively, the first duration and the second duration could be a third duration. In other words, the first UE could consider the third duration as DRX cycle for monitoring or sensing for the sidelink resource pool. The first UE could be (further) configured with a ratio for the first portion of the third duration to the third duration in time domain (e.g., it could be the first duration, P1). The ratio could be pool-specific and/or zone-specific. The ratio could be configured for a pedestrian UE. The first UE could perform sensing, monitoring, or wake up through the first portion. The first UE could determine or derive whether or when to wake up or sleep in the remaining portion of the third duration. In one embodiment, the remaining portion of the third duration could follow the first portion of the third duration. The remaining portion of the third duration could be till the end of the third duration.

Alternatively, the first UE could be configured with periodic period or cycle(s) (e.g., the third duration). The first one of the cycle could be with an offset related or referred to SFN (System Frame Number) or DFN (Direct Frame Number) 0. The first UE could derive a DRX pattern for a cycle based on previous one or more cycles or a number of previous cycles. In one embodiment, the number of previous cycle could be (pre-)configured to UEs or the first UE in the sidelink resource pool. When the first UE performs monitoring or sensing the sidelink resource pool in the beginning, the first UE could monitor or sense the number of whole cycles.

Figure 19:
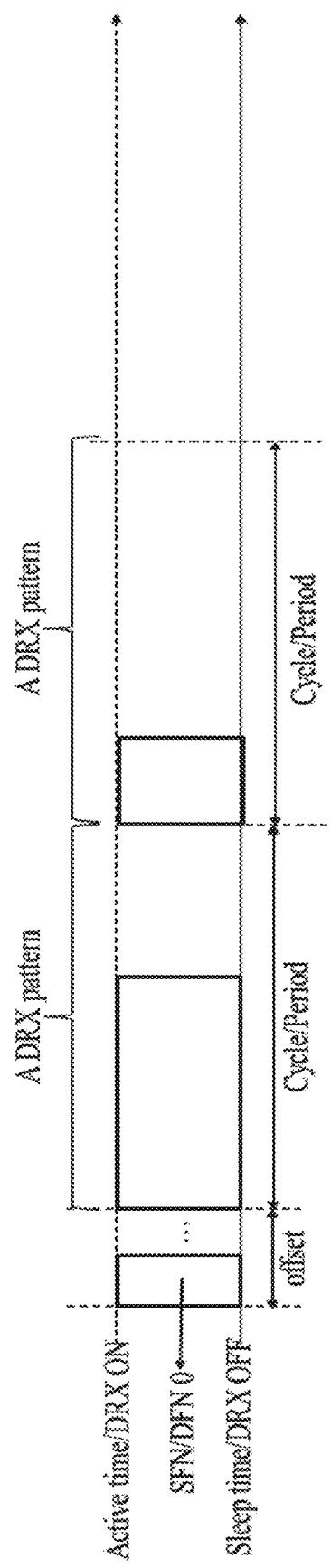
FIG. 19 is a diagram according to one exemplary embodiment.

In one embodiment, after or until the first UE monitors the number of cycles, the first UE could derive a DRX pattern for the next cycle or period. The first UE could be activated by a specific signal to apply the DRX pattern. The specific signal could be referred to description of the first concept above. For example, in FIG. 19, the first cycle is an offset to SFN 0 or DFN 0. In this example, a UE could monitor the sidelink resource pool via a DRX pattern for the first cycle. The UE could derive a DRX pattern for the next or second cycle based on the first cycle. In this example, if less congested or the number of vehicle UE is less in the first cycle, the UE may derive a DRX pattern with less DRX on time.

Figure 20:
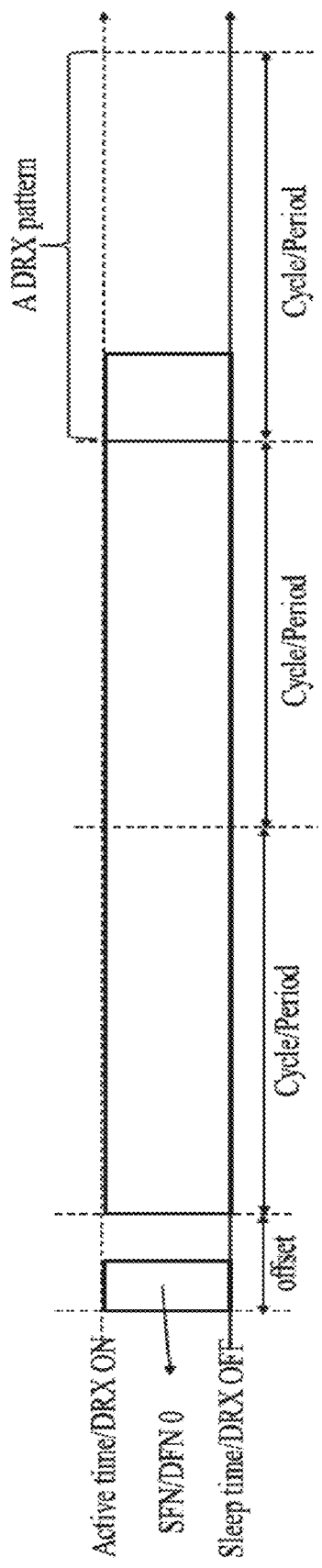
FIG. 20 is a diagram according to one exemplary embodiment.

As another example, in FIG. 20, a UE could monitor or sense a number of cycles and derive a DRX pattern based on the sensing or monitoring result of the previous the number of cycles. In this example, assuming the number could be 2. The UE could monitor the two cycles, and could derive a DRX pattern for the next cycle or the third cycle.

Figure 12:
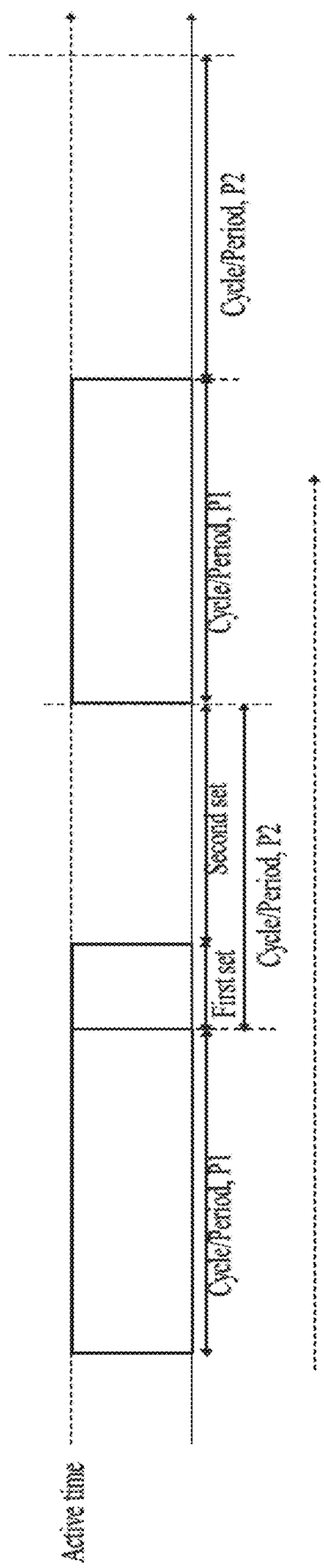
FIG. 12 is a diagram according to one exemplary embodiment.

For example, in FIG. 12, the first UE could monitor or sense during the first duration or period P1. The first UE could derive when to sleep or wake up in the second duration/period P2 based on sensing or monitoring result and/or indication of a signal received in P1. In these examples, the first UE could derive that the first set of slots following the first duration needs to wake up for monitoring. The first UE may not perform monitor or sense in the rest of the second duration P2. The first UE could receive sidelink transmission from a second UE during the first cycle or period, P1, wherein the sidelink transmission indicates one or more reserved (periodic) resource during the second cycle or period, P2. The first UE would wake up or perform monitoring or sensing based on the sidelink transmission. In other words, the first UE may wake up or perform monitoring or sensing during the second cycle or period based on the DRX pattern derived from the first period or cycle and/or indication from other UEs received in the first cycle or duration and/or one or more timers.

Figure 22:
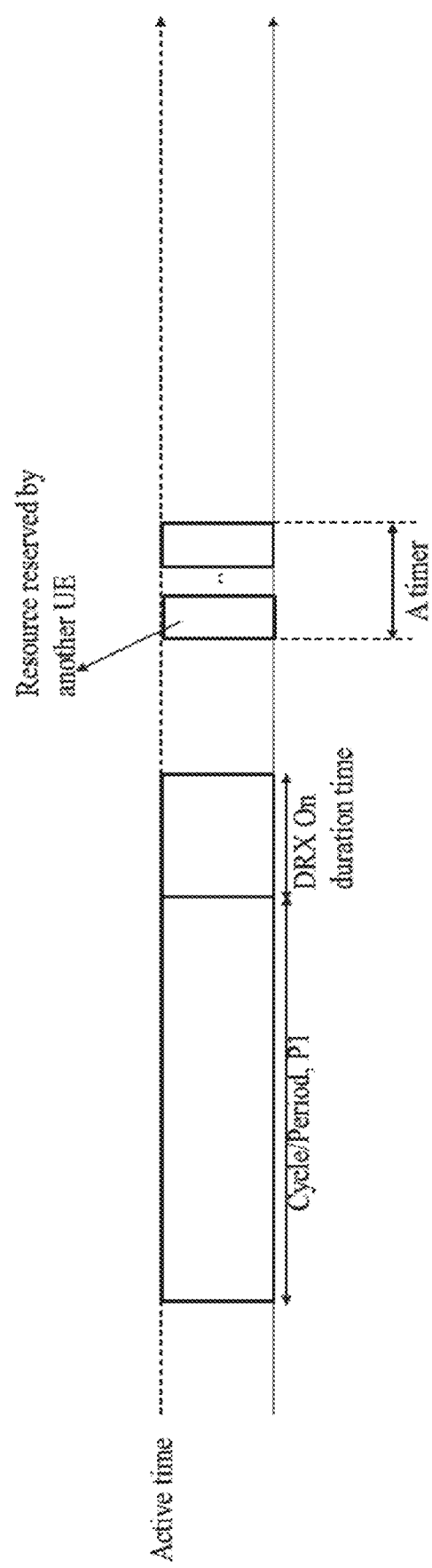
FIG. 22 is a diagram according to one exemplary embodiment.

In one embodiment, the one or more timers could be HARQ-RTT timer, inactivity timer, retransmission timer, or timer in 3GPP TS 38.321. As an example shown in FIG. 22, the first UE receives a sidelink transmission of a TB from the second UE in the first period or cycle, P1, wherein a scheduling SCI for the sidelink transmission of the TB indicate a reserved resource outside the first cycle. The first UE could derive DRX ON duration time based on monitoring, detection, or sensing in the first cycle or period. The first UE could wake up or perform monitoring or sensing before or starting from the reserved resource. The first UE could be indicated or (pre-)configured with a timer. When the first UE (starts to) receive, detect, monitor, or sense the sidelink resource pool based on timing of the reserved resource, the first UE could start the timer. When the timer does not expire, the first UE could perform monitoring or sensing, or wake up for the sidelink resource pool, or wideband or narrowband portion of the sidelink resource pool or carrier. When the timer expires, the first UE may not perform monitoring or sensing for the sidelink resource pool, or wideband or narrowband portion of the sidelink resource pool or carrier.

The first UE could be (pre-)configured with a second timer. The second timer could be offset to SFN 0 or DFN 0. The second timer could start in a periodic manner. If the second timer is running and does not expire, the first UE could wake up, or perform monitoring or sensing for the sidelink pool, or wideband or narrowband portion of the sidelink resource pool or carrier. If the second timer expires, the first UE may not perform monitoring or sensing for the sidelink resource pool, or wideband or narrowband portion of the sidelink resource pool or carrier. In one embodiment, the second timer could be (pre-)configured for a HARQ-process, HARQ-entity, per UE, per sidelink resource pool, or per carrier. The (second) counter could decrease by one when the first UE wake up, or perform monitoring or sensing for a slot in the sidelink pool, or wideband or narrowband portion of the sidelink resource pool or carrier.

Figure 13:
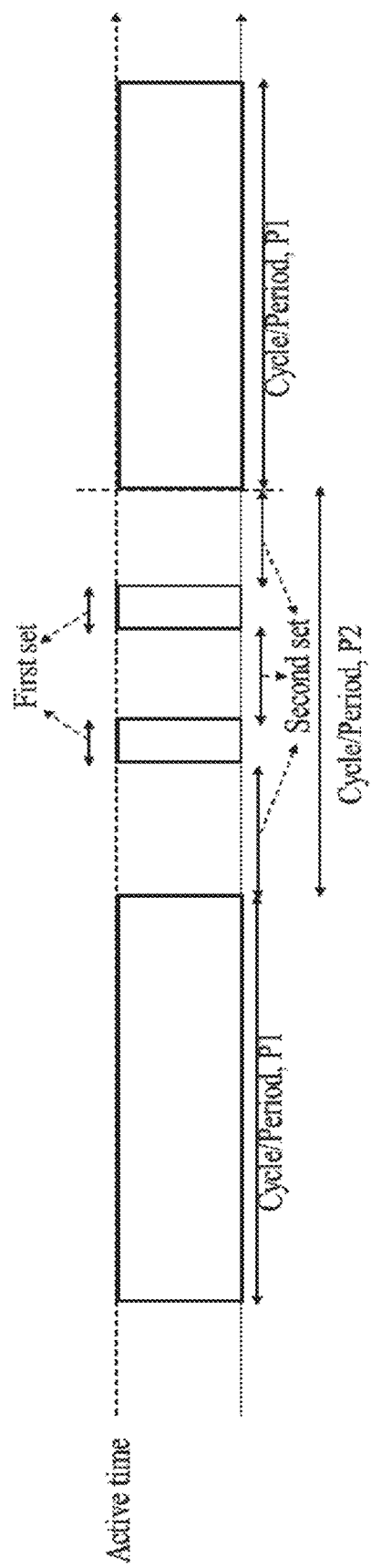
FIG. 13 is a diagram according to one exemplary embodiment.

As another example, in FIG. 13, the first UE could monitor or sense during the first duration or period P1. The first UE could derive when to sleep or wake up in the second duration or period P2 based on sensing or monitoring result and/or indication of a signal received in P1. In this example, the first UE could derive that the first set of slots among the second duration P2 could be dis-contiguously in time domain in the sidelink resource pool. The first UE would wake up and/or perform sensing or monitoring in the first set of slot(s). The first UE could sleep in the second set of slot(s).

A second UE could be configured to perform sidelink transmission. The second UE could be (pre-)configured with the sidelink resource pool. The second UE could be configured or indicated the first duration (e.g., P1) and the second duration (e.g., P2). In other words, the second UE could also know when the first UE may wake up for monitoring. Alternatively, the second UE may not be configured with the first duration. Furthermore, the second UE may not be configured with the second duration. The second UE may not be activated to apply the first duration and/or the second duration.

In one embodiment, the first UE may establish a unicast sidelink link or a groupcast sidelink link with the second UE (e.g., sidelink transmission between the first UE and the second UE may be unicast and/or groupcast). The first UE could transmit or report the first duration and/or the second duration and/or the cycle and/or the DRX pattern within the second duration to the second UE. The second UE could select a candidate resource which the first UE is wake up for monitoring, sensing, or discovery.

In one embodiment, the first UE is (pre-)configured with a (sidelink) resource pool in a carrier or cell for sidelink transmission. The first UE could be indicated or configured with a first duration in the sidelink resource pool. The first UE could perform discovery, sensing, or monitoring within the first duration. The first UE may not sleep within the first duration for the sidelink resource pool or the carrier at least for sidelink.

In one embodiment, the first UE could derive a DRX pattern based on the first duration. The DRX pattern could indicate when the first UE wakes up for sensing or monitoring the sidelink resource pool or the carrier after the first duration. In one embodiment, the first duration could be (pre-)configured in a periodic manner in the sidelink resource pool or in a periodic manner per the first UE. The DRX pattern may be in unit of slot in the sidelink resource pool or in the carrier.

In one embodiment, before the next first duration, the first UE could perform monitoring or sensing for the sidelink resource pool or the carrier based on the DRX pattern. If the DRX pattern indicates a slot (which is in the sidelink resource pool) is DRX off, the first UE may not perform monitor or sense the sidelink resource in the slot. The first UE could derive when to start the next first duration based on the first duration and/or the DRX pattern. The first UE could derive how long the DRX pattern according to the first duration could use. The first UE could derive an available timer for the DRX pattern. The first UE could apply the DRX pattern starting from a slot in the sidelink resource pool, wherein the slot is the next or earliest slot (plus a processing time) after the first duration. In one embodiment, the available timer may be in unit of slot in the sidelink resource pool or in the carrier.

In one embodiment, the first UE could start the next first duration to discovery, sensing, or monitoring after or when the available timer for the DRX pattern expires. The available timer could decrease by 1 when the DRX pattern is applied on a slot, wherein the slot is in the sidelink resource pool or in the carrier. When the available timer reaches to 0, the DRX pattern may expire. The next first duration could start from a second slot, wherein the second slot is the next or earliest slot (plus a processing time) after the DRX pattern expires.

In one embodiment, the first UE could perform discovery, sensing, or monitoring within the next first duration. The first UE could derive a second DRX pattern based on the next first duration, wherein the second DRX pattern indicates when the first UE wakes up for sensing or monitoring the sidelink resource pool or the carrier after the next first duration. The next first duration could be a second duration.

In one embodiment, the first UE may be a pedestrian UE. The first UE could be concerned about power saving. The second UE may not be a pedestrian UE. The second UE may not be concerned about power saving.

Third Concept:

A first UE and a second UE could be (pre-)configured to perform sidelink transmission and/or reception in a sidelink resource pool. The sidelink resource pool could be (further) (pre-)configured with a specific time duration, cycle, or period among in a periodic manner. The first UE in the specific time duration may need to wake up and/or perform monitoring or sensing the sidelink resource pool. In one embodiment, the first UE could transmit a sidelink transmission (e.g., P2V sidelink transmission) to the second UE and/or surrounding or nearby UEs. The sidelink transmission could be SCI (scheduling PSSCH). The sidelink transmission could indicate a DRX pattern of the first UE. The length of the DRX pattern in time domain may be equal to the length of the specific duration, cycle, or period in time domain. In one embodiment, the length of specified duration, cycle, or period in time domain is an integer multiple of the length of the DRX pattern in time domain. The length of the DRX pattern in time domain may be in unit of resource in the sidelink resource pool.

In one embodiment, the sidelink transmission could trigger or activate the second UE (and/or surrounding vehicle UEs) to take the specific time duration into account. The first UE could apply the DRX pattern with an offset referred to SFN 0 or DFN 0. The first UE could transmit the sidelink transmission in a first specific duration, cycle, or period. The first UE could apply the DRX pattern on a second specific duration, cycle, or period. The second specific duration, cycle, or period may be the next or most recent specific duration, cycle, or period with a processing time after the first specific duration, cycle, or period. The second specific duration, cycle, or period could be the first specific duration, cycle, or period. In other words, the first UE applies the DRX pattern for current specific duration, cycle, or period from a slot in the sidelink resource pool.

In one embodiment, the beginning of the DRX pattern may be aligned with the beginning of the current specific duration, cycle, or period. The beginning of the DRX pattern could also be aligned with beginning of the slot or beginning of resource of the slot. If the length of the DRX pattern is larger than the length of the specific duration, cycle, or period, the first UE may not apply the remaining portion of the DRX pattern. In other words, for the next specific duration, cycle, or period, the first UE could apply the DRX pattern via aligning the beginning of the DRX pattern with the beginning of the specific duration, cycle, or period.

In one embodiment, if the DRX pattern for the slot is ON, the first UE could monitor, sense, or wake up the sidelink resource. If the DRX pattern for the slot is OFF, the first UE may not monitor or sense the sidelink resource pool. The slot could be the next slot or resource in the sidelink resource pool after the first UE transmits the sidelink transmission. The first UE applies the DRX pattern could mean or imply that the first UE monitors or senses based on the DRX pattern.

In one embodiment, the first UE could monitor or sense the sidelink resource pool based on the DRX pattern for (each) one or more future specific durations, cycles, or periods. The first UE could be (pre-) configured with a timer. The timer could be used for indicating whether the DRX pattern is available or not. When the first UE applied the DRX pattern, the timer may start. The sidelink transmission could indicate the timer-related information.

In one embodiment, the sidelink transmission may not comprise or indicate the timer-related information (e.g., the timer is implicitly related to the (pre-)configuration of the sidelink resource pool). The timer could be in unit of number of specific duration, cycle, or period. If the timer expires, the first UE could derive an updated DRX pattern and transmits to the surrounding UEs. If the timer expires, the first UE could perform monitoring or sensing all the time until receiving a signal indicating a DRX pattern. The signal could be referred to the description in the first concept.

In one embodiment, in response to receive the sidelink transmission, the second UE could transmit and/or select at least a resource of a TB in the specific time duration. The resource in the specific time duration could ensure the first UE could monitor, detect, or sense the V2P successfully. In other words, before the second UE receives the sidelink transmission, the second UE may not take the specific time duration into account (e.g., the second UE does not have need to select at least a resource of a TB in the specific time duration). In one embodiment, the motivation could be considering situation like high railway, which most of time there are no pedestrian in the high railway.

In one embodiment, the resource selection in the specific time duration may be performed for delivering V2P message or V2X message, which can be utilized or received by or for pedestrian UE. The resource selection in the specific time duration may be performed for sidelink broadcast transmission. The resource selection limited in the specific time duration may not be performed for delivering V2V message or V2X message, which cannot be utilized or received by or for pedestrian UE. The resource selection limited in the specific time duration may not be performed for sidelink unicast or groupcast transmission.

Alternatively, the first UE could transmit the sidelink transmission (e.g., P2V sidelink transmission) to the second UE and/or surrounding or nearby UEs, wherein the sidelink transmission indicates presence of pedestrian UE (e.g., the first UE). The second UE may receive the sidelink transmission from the first UE. In response to receiving the sidelink transmission, preferably, the second UE may generate V2P message or V2X message, which can be utilized or received by or for pedestrian UE. In response to receiving the sidelink transmission, the second UE may transmit and/or select at least a resource of a TB in the specific time duration. The TB may deliver V2P message or V2X message, which can be utilized or received by or for pedestrian UE. The generation of V2P message or V2X message may be performed within a V2P time duration.

In one embodiment, the resource selection limited in the specific time duration may be performed within a V2P time duration. The V2P time duration may be started or restarted (e.g., a timer corresponding to V2P time duration starts or restarts), in response that the second UE receives the sidelink transmission and/or presence of pedestrian UE. The time length of the V2P time duration for the second UE may be determined based on traffic load, zone, environment, speed of second UEs. After or out of the V2P time duration (e.g., a timer corresponding to V2P time duration is expired), the second UE may not generate V2P message or V2X message, which can be utilized/received by/for pedestrian UE. After or out of the V2P time duration (e.g., a timer corresponding to V2P time duration is expired), the second UE may not transmit or select a resource of a TB in the specific time duration, wherein the TB delivers V2P message or V2X message, which can be utilized or received by or for pedestrian UE.

In one embodiment, the first UE may be a pedestrian UE. The first UE may be concerned about power saving. The second UE may not be a pedestrian UE. The second UE may not be concerned about power saving.

Fourth Concept:

A first UE and a second UE could be (pre-)configured to perform sidelink transmission and/or reception in a sidelink resource pool. The sidelink resource pool could be (further) (pre-)configured with a specific time duration (among) in a periodic manner. The first UE in the specific time duration may need to wake up and/or perform monitoring or sensing the sidelink resource pool. The second UE could reserve resource(s) for sidelink transmission in a periodic manner. In one embodiment, a reserved resource among the reserved resource(s) could be used for sidelink transmission of a TB. Among the reserved resource(s), if a reserved resource for sidelink transmission of a TB is outside or is not within the specific time duration, the second UE could transmit an additional one (e.g. a retransmission of the TB) in the specific time duration. The TB could deliver V2P messages. In one embodiment, the TB could deliver V2X message, which can be utilized or received by or for pedestrian UE.

Figure 15:
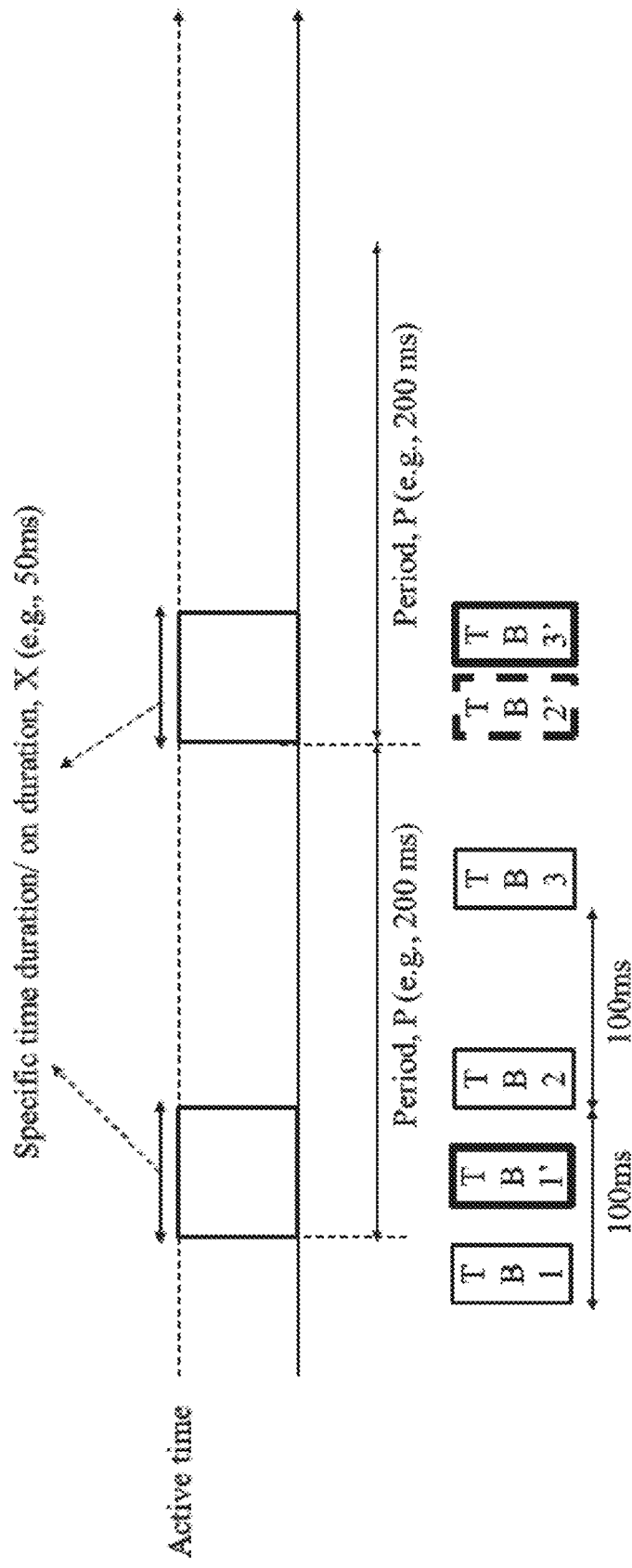
FIG. 15 is a diagram according to one exemplary embodiment.

For example, in FIG. 15, assuming a first UE and a second UE are (pre-) configured with a sidelink resource pool, the specific time duration could be 50 ms duration among a 200 ms duration. 50 ms and 200 ms could be in unit of slot of the sidelink resource pool. In one embodiment, the first UE in the specific time duration may need to wake up and/or perform monitoring or sensing the sidelink resource pool. Assuming the second UE (e.g., vehicle UE) transmits broadcast sidelink transmission every 100 ms in the sidelink resource pool, may need to or may be required to transmit an additional one in the specific time duration. In this example, the second UE may need to transmit TB 1' in the specific time duration, and TB 1' could be TB 1. In one embodiment, the second UE may transmit or may need to transmit TB 3' in the next specific time duration, and TB 3' could be TB 3. The second UE may transmit the most recent or the latest TB which is in sleep time in the next specific time duration. The second UE may transmit or may need to transmit TB 2' and TB 3' in the next specific time duration, and TB 2' could be TB 2 and TB 3' could be TB 3.

In one embodiment, V-UE may transmit TB to network and network (as a relay) transmits TB to the P_UE. Additionally or alternatively, if a reserved resource (or all reserved resources) for sidelink transmission of a TB (to the first UE) is not within the specific duration, the second UE could perform an uplink transmission to transmit the TB to a network. The network could transmit the (content of the) TB to the first UE via Uu link (e.g. DL dedicated transmission or broadcast).

In one embodiment, the first UE could be a pedestrian UE. The first UE may be concerned about power saving. The second UE may not be a pedestrian UE. The second UE may not be concerned about power saving.

Fifth Concept:

A first UE and a second UE could be (pre-)configured to perform sidelink transmission and/or reception in a sidelink resource pool. The sidelink resource pool could be (further) (pre-)configured with cycle(s) in a periodic manner. The periodic manner may be in unit of slot in the sidelink resource pool. The first UE could be (pre-) configured with a list of DRX pattern.

In one embodiment, every DRX pattern among the list of DRX pattern could be applied for a cycle. The first UE could be configured with a default entry from the list as a (default) DRX pattern. A DRX pattern could comprise activity time duration and/or sleep duration for a cycle. A DRX pattern or length of a DRX pattern could comprise a DRX ON duration and a DRX OFF duration. In one embodiment, a first cycle could be an offset related or referred to SFN 0 or DFN 0.

In one embodiment, a DRX pattern from the list could be applied aligning starting symbol or starting slot of the cycle. If the first UE receives the DRX pattern from the second UE, the first UE could apply the DRX pattern. The first UE could perform monitoring or sensing and/or sleep based on the DRX pattern. The first UE could perform monitoring or sensing for the sidelink resource pool during the DRX ON duration of the DRX pattern. The first UE may not perform monitoring or sensing for the sidelink resource pool during the DRX OFF duration of the DRX pattern. If the first UE does not receive the DRX pattern, the first UE may not be allowed to perform DRX mode (e.g., sleep in sometime for the sidelink resource pool). If the first UE does not receive the DRX pattern, the first UE could perform monitoring or sensing the sidelink resource pool the whole time. The first UE could perform monitoring or sensing the sidelink resource pool the whole time until the first UE receives the DRX pattern indicated by the second UE.

In one embodiment, the second UE could (further) indicate an available timer for the DRX pattern. The first UE could apply the DRX pattern based on the available timer. When the available timer expires (e.g., reaches to 0), the first UE may not perform monitor based on the DRX pattern.

In one embodiment, the first UE could perform sensing or monitoring for the sidelink resource pool whole the time until receiving indication from the second UE for an update DRX pattern). The available timer could be included in an entry of the list of DRX pattern (e.g., an entry indicates an available timer and a DRX pattern). The available timer could be a wake up timer. The available timer could indicate when to wake up after the DRX pattern. In one embodiment, the available timer could indicate when to wake up after the cycle.

In one embodiment, the first UE could apply the available timer when or after the DRX pattern end. The first UE could also apply the available timer when or after the cycle end. When the available timer expires (e.g., reaches to 0), the first UE could wake up for monitoring or sensing the sidelink resource pool and/or the carrier. Until the available timer expires, the first UE may sleep or may not perform monitoring or sensing for the sidelink resource pool or the carrier. The available timer could be the length of the DRX pattern. The available timer could be larger than the length of the cycle.

Figure 23:
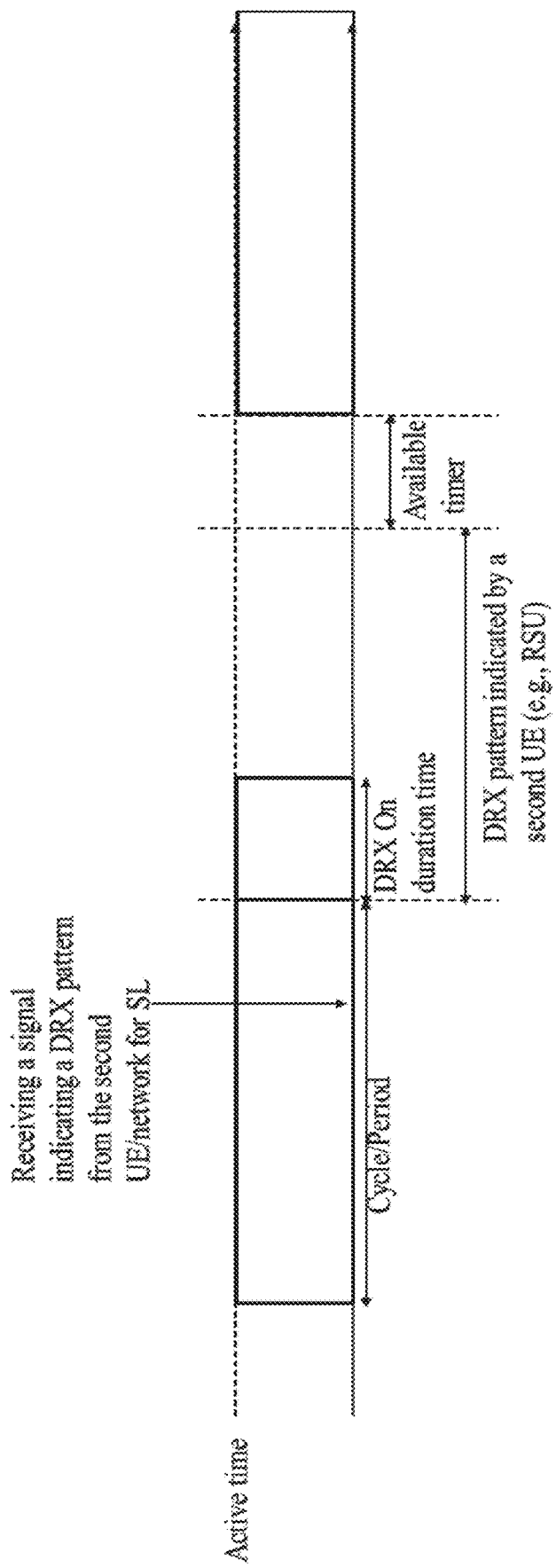
FIG. 23 is a diagram according to one exemplary embodiment.
Figure 24:
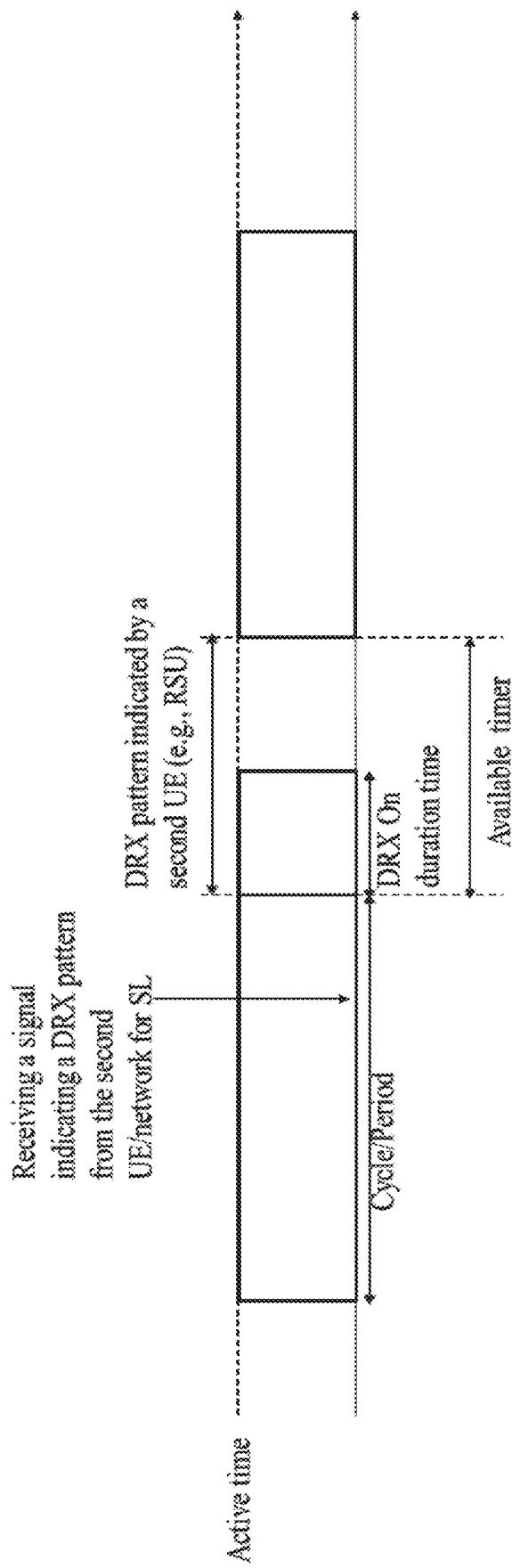
FIG. 24 is a diagram according to one exemplary embodiment.

For example, in FIG. 23, assuming a first UE receives a signal indicating a DRX pattern from a second UE, the available timer could be applied after the first UE apply the DRX pattern. As another example, in FIG. 24, the available timer could be applied after the cycle where the first UE wake up for monitoring or sensing. In one embodiment, a DRX pattern could be indicated by parameters (e.g. drx-onDurationTimer, drx-SlotOffset, length of the DRX pattern in unit of slot in the sidelink resource pool). A congestion-related value could associate a list of DRX pattern. The first UE and/or the second UE could be (pre-)configured with one or more lists of DRX pattern which a DRX pattern list is associated to a congestion-related value. The first UE and/or the second UE could derive the congestion-related value of the sidelink resource pool. The list of DRX pattern associated to the congestion-related value could be more suitable for pedestrian UE to monitor or sense the sidelink resource pool. The congestion-related value could be CBR value.

In one embodiment, the second UE could perform sensing or monitoring for the sidelink resource pool. The sidelink resource pool could be associated to a zone. The second UE could derive a DRX pattern (e.g., DRX cycle length or DRX on duration length) based on the sensing result. The second UE could indicate, configure, or assist the first UE with the DRX pattern. The second could transmit a signal indicating the DRX pattern to the first UE. The second UE could indicate the first UE the DRX pattern by indicating one entry of a DRX list.

In one embodiment, the second UE could (explicitly or implicitly) indicate a starting timing for applying the DRX pattern. The second UE and/or the first UE could be (pre-)configured with a set of starting timing (e.g., slot). The start timing could be a first OFDM (Orthogonal Frequency Division Multiplexing) symbol available for sidelink in a slot.

In one embodiment, the set of timing could be common for the sidelink resource pool. The first UE may apply the (indicated) DRX pattern starting from a next cycle or period. The first UE may apply the (indicated) DRX pattern from the earliest timing or slot in the set of timing after the first UE receives the signal. The first UE may apply the (indicated)

DRX pattern on a slot, wherein the slot is the next or earliest slot in the sidelink resource pool after the first UE receives the signal.

Figure 25:
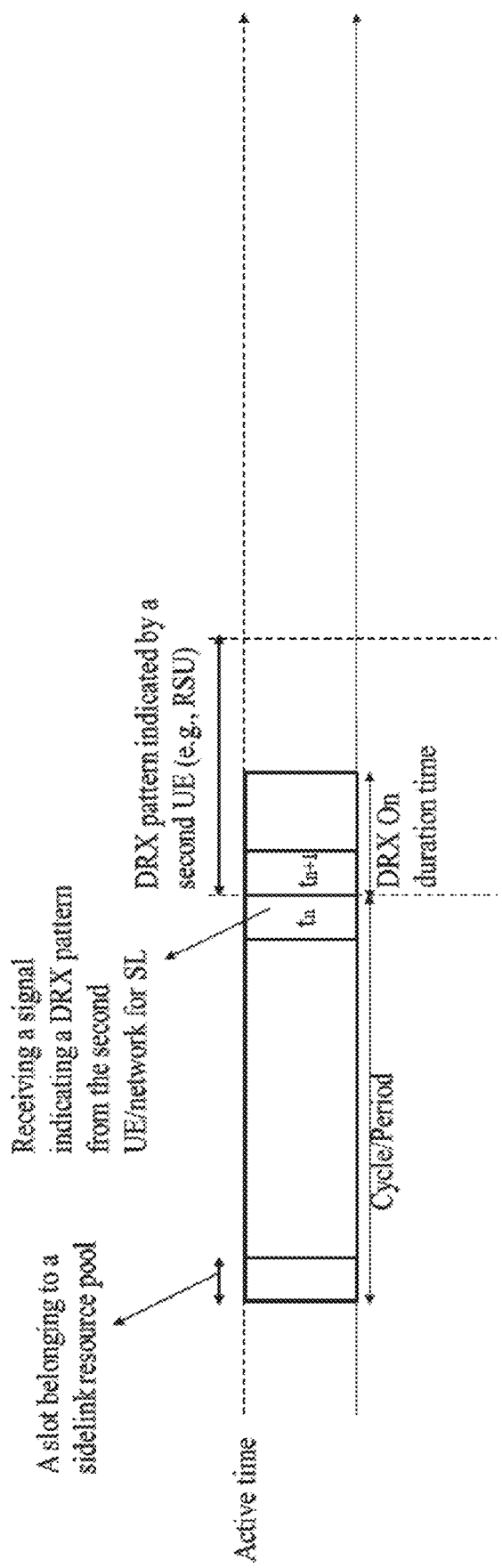
FIG. 25 is a diagram according to one exemplary embodiment.

For example, in FIG. 25, assuming a first UE receives a signal in slot tn indicating a DRX pattern from a second UE, the first UE may apply the DRX pattern starting from slot tn+1, which is the earliest slot in the sidelink resource pool after the first UE receives the signal. In one embodiment, $t_{n+1}$ could also be explicitly indicated by the signal or by the second UE.

Figure 26:
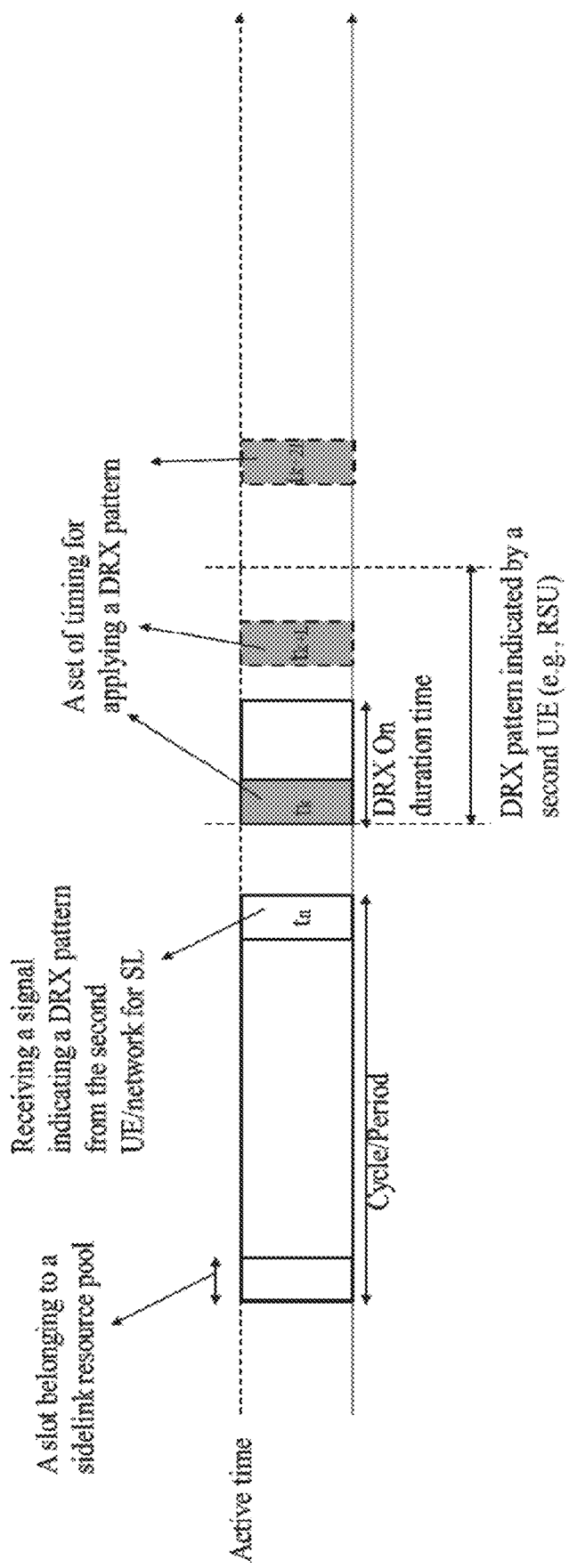
FIG. 26 is a diagram according to one exemplary embodiment.

As another example, in FIG. 26, assuming a first UE and a second UE could be (pre-)configured with a set of starting timing (which could be illustrated as $t_k$, $t_{k+L}$, $t_{k+2L}$), the set of starting timing could be in a periodic manner. The first UE could receive a signal in slot tn indicating a DRX pattern from a second UE. The first UE could apply the DRX pattern starting from slot $t_k$, which is the earliest slot in the set of starting timing in the sidelink resource pool after the first UE receives the signal.

In one embodiment, the signal could be broadcast sidelink transmission, groupcast sidelink transmission, and/or unicast sidelink transmission. The signal could be SCI, PSSCH, MAC CE, MAC PDU, RRC message, or PSFCH. The first UE could trigger or transmit an indication to the second UE for request the DRX pattern.

In one embodiment, for NR sidelink mode-1 UE, the first UE could be configured by a network to add or remove the list. The first UE could receive an indication from a network via Uu link. The first UE could receive an indication from a third UE via PC5 interface or sidelink.

In one embodiment, the indication may be delivered or transmitted via sidelink broadcast transmission. The indication could indicate the first UE to apply an updated DRX pattern in the next cycle. The indication could indicate positive or negative adjustment of the entry number. In one embodiment, the first UE could derive the updated DRX pattern based on current DRX pattern and the indication. The first UE could derive the updated DRX pattern based on any of current DRX pattern, the indication, and speed of the first UE.

In one embodiment, the indication could indicate an entry number of the list. The first UE would derive the updated DRX pattern based on the indication. The third UE could be a road side unit (RSU).

In one embodiment, if the first UE does not receive the indication, the first UE may apply current DRX pattern for the next cycle. The first UE may apply a (default) DRX pattern without receiving the indication. When the first UE receives the indication, the first UE may apply the updated DRX pattern derived based on the indication. When the first UE receives the indication, the first UE may apply the updated DRX pattern for a DRX valid time duration. The DRX valid time duration may be started or restarted (e.g., a timer corresponding to DRX valid time duration starts or restarts), in response that the first UE receives the indication.

In one embodiment, the time length of the DRX valid time duration may be determined by the third UE or network based on traffic load, zone, environment, and/or speed of the first UE. When the first UE does not receive the indication for a while, the first UE may (back to) apply the (default) DRX pattern. The first UE may (back to) apply the (default) DRX pattern, after or out of the DRX valid time duration (e.g., a timer corresponding to DRX valid time duration is expired).

In one embodiment, the (default) DRX pattern may be that the first UE receives, monitors, or senses all slots of the sidelink resource pool. The (default) DRX pattern may also be a DRX pattern without sleep or DRX off duration (in a cycle). Furthermore, the (default) DRX pattern may be NO DRX operation. In one embodiment, the (default) DRX pattern may be a DRX pattern with shorter cycle or shorter sleep or less DRX off duration (in a cycle). In one embodiment, the (default) DRX pattern may be a DRX pattern with longer cycle or longer sleep or containing more DRX off duration (in a cycle).

In one embodiment, the first UE could be a pedestrian UE. The first UE could be concerned about power saving. The second UE could be a road side unit (RSU). The second UE could indicate the DRX pattern based on sidelink or PC5 interface. The second UE could be a RSU associated to a network. The RSU or the second UE could indicate the DRX pattern based on downlink or Uu interface.

Sixth Concept:

In general, the motivation of the sixth concept is the pedestrian UE could not only has power saving scheme in time domain but also has power saving scheme in frequency domain.

A first UE could be configured with a sidelink resource pool. The sidelink resource pool could comprise a first set of slot(s) which contains a first number frequency resource(s) and a second set of slot(s) which contains a second number frequency resource(s). In one embodiment, the first number frequency resource(s) may be larger than the second number frequency resource(s). The first UE could monitor or sense the second set of slots by a narrowband RF chain. The first UE could monitor or sense the first set of slots by a wideband RF chain.

In one embodiment, the first number frequency resource(s) could fully include the second number frequency resource(s) or partially overlapped with the second number frequency resources in frequency domain or non-overlapped with the second number frequency resources in frequency domain. The first set of slot(s) and the second slot(s) could be in a cycle or period. The first UE could be (pre-)configured with the cycle or period in a periodic manner. The first set of slots could be continuous in a sidelink carrier in time domain. The second set of slots could be continuous in a sidelink carrier in time domain. For example, assuming a slot in a sidelink resource pool could be denoted as to and a cycle could be P (e.g., $t_m$, $t_{m+1}$, ..., $t_{m+P-1}$), the first set of slots could be tm to $t_{m+k-1}$ and the second set of slots could be $t_{m+k}$ to $t_{m+P-1}$.

Figure 18:
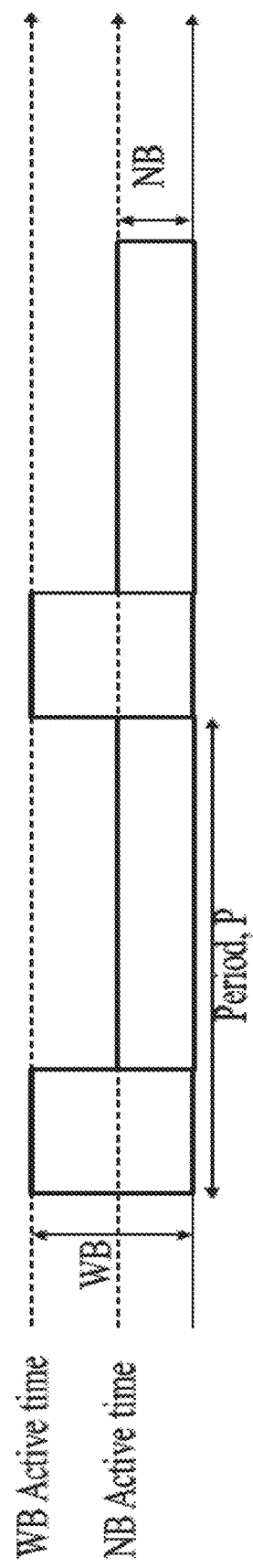
FIG. 18 is a diagram according to one exemplary embodiment.

For example, in FIG. 18, the first UE could be (pre-)configured with a sidelink resource pool as illustrated in FIG. 18. For a first portion among a period P, the sidelink resource pool could contain more frequency resources while the sidelink resource pool contains less frequency resources in the last portion of the period P.

Alternatively, a first UE could be configured with a first sidelink resource pool and a second sidelink resource pool. The first sidelink resource pool may contain more frequency resource(s) than the second sidelink resource pool (e.g., the first sidelink resource pool is wideband). The second sidelink resource pool may contain less frequency resource(s) than the first sidelink resource pool (e.g., the second sidelink resource pool is narrow band). The first sidelink resource pool and the second sidelink resource pool may be TDMed in the carrier.

In one embodiment, a resource in the first sidelink resource pool may not overlap in time domain with a resource in the second sidelink resource pool. The first UE could monitor or sense the second sidelink resource pool by a narrowband RF chain. The first UE could monitor or sense the first sidelink resource pool by a wideband RF chain. It may improve power saving since the first UE does not need to always use wideband RF chain for sensing or monitoring. In one embodiment, the first sidelink resource pool may mean or represent a first set of sidelink resource pool(s), and the second sidelink resource pool may mean or represent a second set of sidelink resource pool(s).

Figure 16:
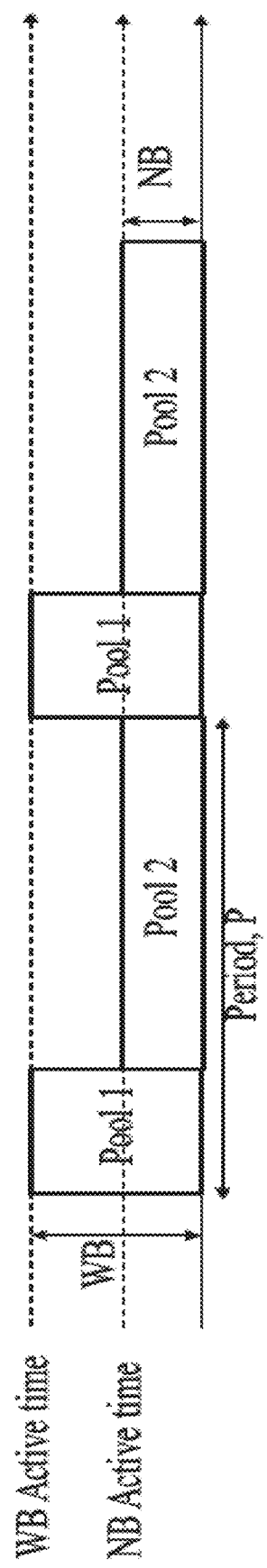
FIG. 16 is a diagram according to one exemplary embodiment.
Figure 17:
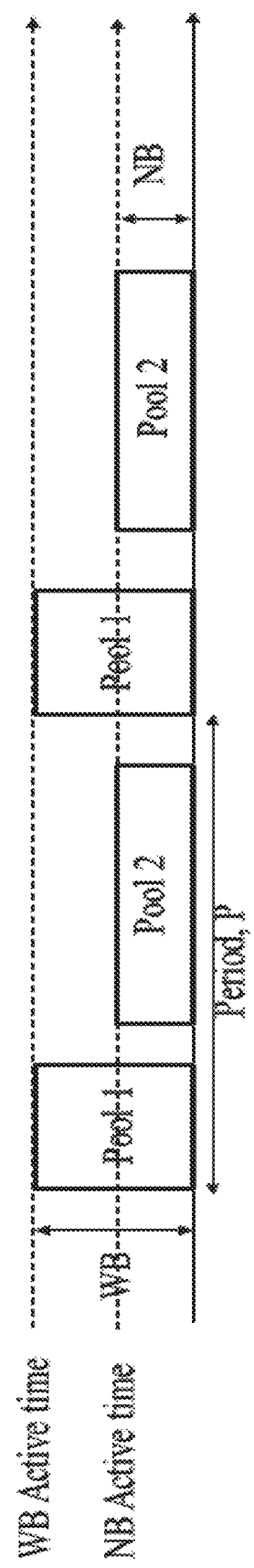
FIG. 17 is a diagram according to one exemplary embodiment.

For example, in FIG. 16, assuming pool 1 is wideband and pool 2 is narrowband, the first UE could monitor or sense wideband Pool 1 and narrowband Pool 2. In this example, Pool 1 and Pool 2 may be configured in a periodic manner. In other words, in a first cycle or period (e.g., P), Pool 1 could be (pre-)configured in the first portion of the first cycle or period, and Pool 2 could be (pre-)configured in the last portion of the first cycle or period. Alternatively or preferably, in FIG. 17, Pool 1 and Pool 2 could be dis-continuous in time domain in the sidelink carrier. During the duration between these two pools in time domain, the first UE could sleep for power saving. The first UE may switch RF chain in the duration between these two pools in time domain. The first UE may not need to perform monitor or sense in the duration between these two pools in time domain.

In one embodiment, the first UE may be a pedestrian UE. The first UE may be concerned about power saving.

Seventh Concept:

A UE could be (pre-)configured to perform sidelink communication (e.g. the UE is configured to monitor or sense one or more sidelink resource pools or sidelink channels). The UE could be (pre-)configured with a DRX pattern associated with a Uu link with a network. The DRX pattern could comprise one or more first time periods, wherein the UE monitors or senses resource pools or sidelink (or downlink) channels in the one or more first time periods. The DRX pattern could comprise one or more second time periods, wherein the UE may not monitor or sense resource pools or sidelink (or downlink) channels in the one or more second time periods. If the UE is configured with a first DRX pattern associated with a Uu link, the UE could derive a second DRX pattern associated with a sidelink at least based on the first DRX pattern. In one embodiment, the first time periods may comprise DL slots, slots with PDCCH monitoring, and sidelink slots. The second time periods may comprise DL slots, slots with PDCCH monitoring, and sidelink slots.

For example, parameters of the second DRX pattern could be the same (e.g. have the same value) as associated parameters of the first DRX pattern (e.g. drx-onDurationTimer, drx-SlotOffset). Additionally or alternatively, the parameters of the second DRX pattern could not be the same (e.g. have the same value) as the parameters associated with the first DRX pattern. In one embodiment, the first DRX pattern may be in units of slot, or time domain resources or milliseconds.

In one embodiment, parameters of the first DRX pattern may be in units of slot, or time domain resources or milliseconds. The slots or the time domain resources may contain PDCCH, control resource set (CORESET), search space, downlink symbol, or flexible symbol. The second DRX pattern may be in units of slot, or time domain resources or milliseconds.

In one embodiment, parameters of the first DRX pattern may be in units of slot, or time domain resources or millisecond. The slot or the time domain resource may be resource contained in a (same) sidelink resource pool (in a carrier). The UE could have aligned sleeping time and/or wake up time for power saving.

The UE could be (pre-)configured with a DRX pattern. The DRX pattern could indicate when the UE wakes up, monitors, or senses Uu downlink and/or sidelink resource in a sidelink resource pool or sidelink resource in a carrier. For example, in FIG. 21, assuming a UE is configured with a DRX pattern, the UE could monitor, sense, or wake up based on the DRX pattern in the first cycle. The DRX pattern may contain a slot containing CORESET, search space, PDCCH, downlink symbol, or flexible symbol in the beginning or in the middle of the slot. The DRX pattern may also contain a slot containing whole symbol for sidelink resource (in a sidelink resource pool). Furthermore, the DRX pattern may contain a slot containing a portion of symbols for sidelink resource (in a sidelink resource pool).

Figure 21:
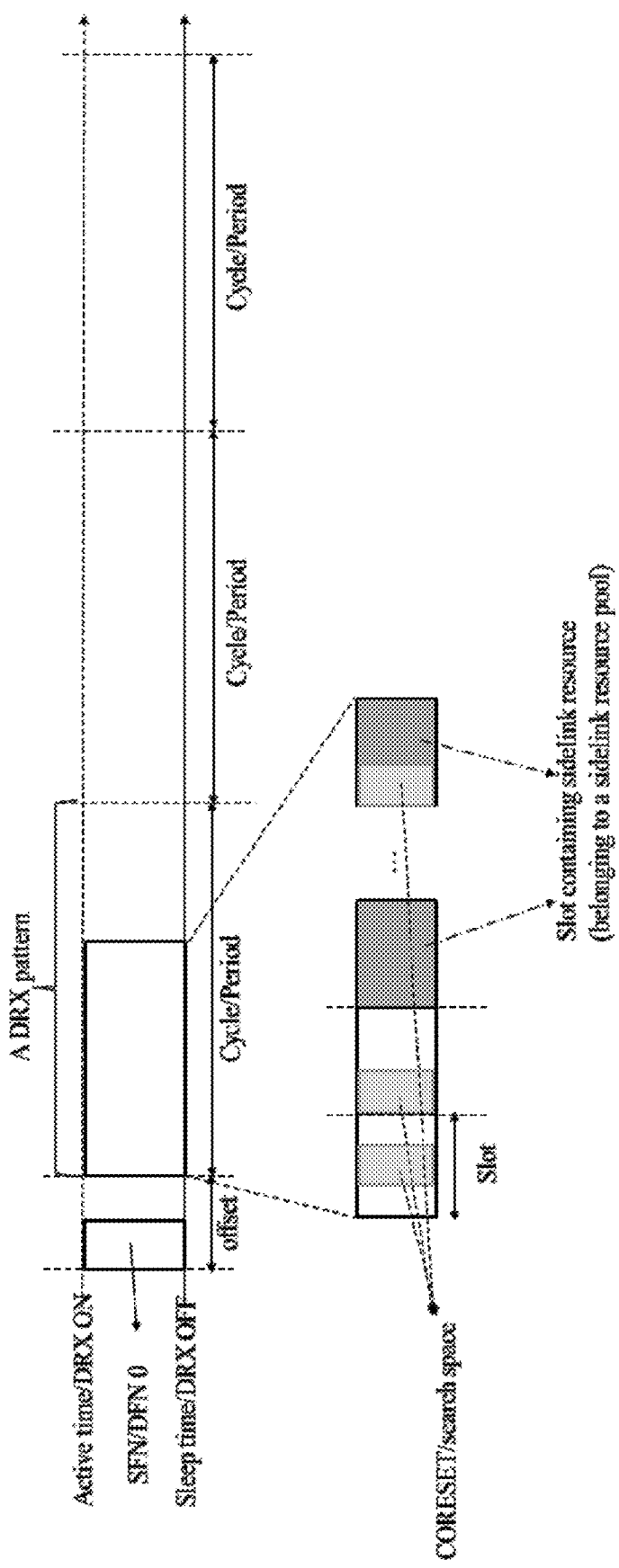
FIG. 21 is a diagram according to one exemplary embodiment.

In one embodiment, when a slot contains CORESET, search space, PDCCH, downlink symbol, or flexible symbol in the beginning of the slot and contains symbols for sidelink resource (in a sidelink resource pool), the slot could be counted once (rather than two times). In other words, the UE could monitor, sense, or wake up Uu and sidelink resource in the active time in the first cycle based on the DRX pattern. The UE may not wake up, monitor, or sense Uu and sidelink resource in the sleep time in the first cycle. For example, the UE may not wake up, monitor, or sense possible slots as shown in FIG. 21.

In one embodiment, the DRX pattern could be counted as only slot containing PDCCH, CORESET, or search space. The DRX pattern may not count including slot belonging to the sidelink resource pool. Furthermore, the DRX pattern may not include slot which does not contain PDCCH, CORESET, or search space. In one embodiment, one or more timers could control the UE whether to wake up or not in NR Uu.

In one embodiment, the UE could wake, or perform monitoring or sensing a resource or slot in the sidelink resource pool based on whether the UE is in NR Uu DRX ON time or not. If the UE wakes up based on the DRX pattern and/or timer(s) in NR Uu, the UE could perform monitoring or sensing the sidelink resource pool.

If a slot containing resource belonging to the sidelink resource pool is in DRX active or DRX ON based on the DRX pattern and/or timer(s) in NR Uu, the UE could monitor the sidelink resource pool or the carrier in the slot. If a slot containing resource belonging to the sidelink resource pool is not in DRX active/DRX ON based on the DRX pattern and/or timer(s) in NR Uu, the UE may not monitor the sidelink resource pool or the carrier in the slot. The UE could be (further) (pre-)configured with one or more sidelink timers. The one or more sidelink timers could indicate the UE to wake up for monitoring sidelink resource and/or NR Uu. Value of the one or more sidelink timers could be derived based on congestion or number of surrounding UE, UE's speed, or RSU indication. In one embodiment, the one or more sidelink timers could be (pre-)configured in a periodic manner.

As another example, an active time for sidelink of the UE (according to the second DRX pattern) could be (partially) the same (in time domain) as the active time for Uu link of the UE (according to the first DRX pattern). Additionally or alternatively, the active time for sidelink could be within the active time (in time domain) for Uu link of the UE. Additionally or alternatively, the active time for Uu link could be within the active time (in time domain) for sidelink of the UE. Additionally or alternatively, for the UE, the active time associated with sidelink may not be the same as the active time associated with Uu. Additionally or alternatively, for the UE, inactive time (e.g. time periods when the UE is not in active time) associated with sidelink may not overlap with inactive time associated with Uu.

Additionally or alternatively, a network could provide (e.g. configure) a UE with a first DRX pattern and a second DRX pattern, wherein the first DRX pattern is associated with Uu link of the UE and the second DRX pattern is associated with sidelink of the UE. The first DRX pattern could be the same as the second DRX pattern (e.g. active time is the same in time domain). Alternatively, the active time (inactive time) associated with the first DRX pattern may not overlap with the active time (inactive time) associated with the second DRX pattern.

In one embodiment, the sidelink slot within the active time associated with the second DRX pattern may be within the active time associated with the first DRX pattern. The UE may be operated or configured with sidelink mode 1. The first DRX pattern may comprise DL slot, slot with PDCCH monitoring, and sidelink slot. The second DRX pattern may comprise DL slot, slot with PDCCH monitoring, and sidelink slot. A slot with PDCCH monitoring and sidelink symbol(s) may be counted or considered in the first DRX pattern and the second DRX pattern.

In one embodiment, the UE could be a Pedestrian UE. The UE could be concerned about power saving.

Throughout the present application, in one embodiment, one or more sidelink resource pool(s) could be (pre-)configured in a carrier. A UE applying a DRX pattern (for a sidelink resource pool) could be or could imply that the UE wakes up, or performs monitoring or sensing based on the DRX pattern. A UE is indicated or configured with a cycle/period in a periodic manner could imply or could be equivalent to a UE is indicated or configured with a plurality of cycles or period. The plurality of cycles or periods could occur periodically.

In one embodiment, the first UE may be a UE configured with sidelink power saving. The first UE may also be a UE configured with DRX operation or procedure. The second UE may be a UE not configured with sidelink power saving. Furthermore, the second UE may be a UE not configured with DRX operation or procedure.

All or some of above embodiments and/or concepts can be combined to form a new embodiment.

Figure 27:
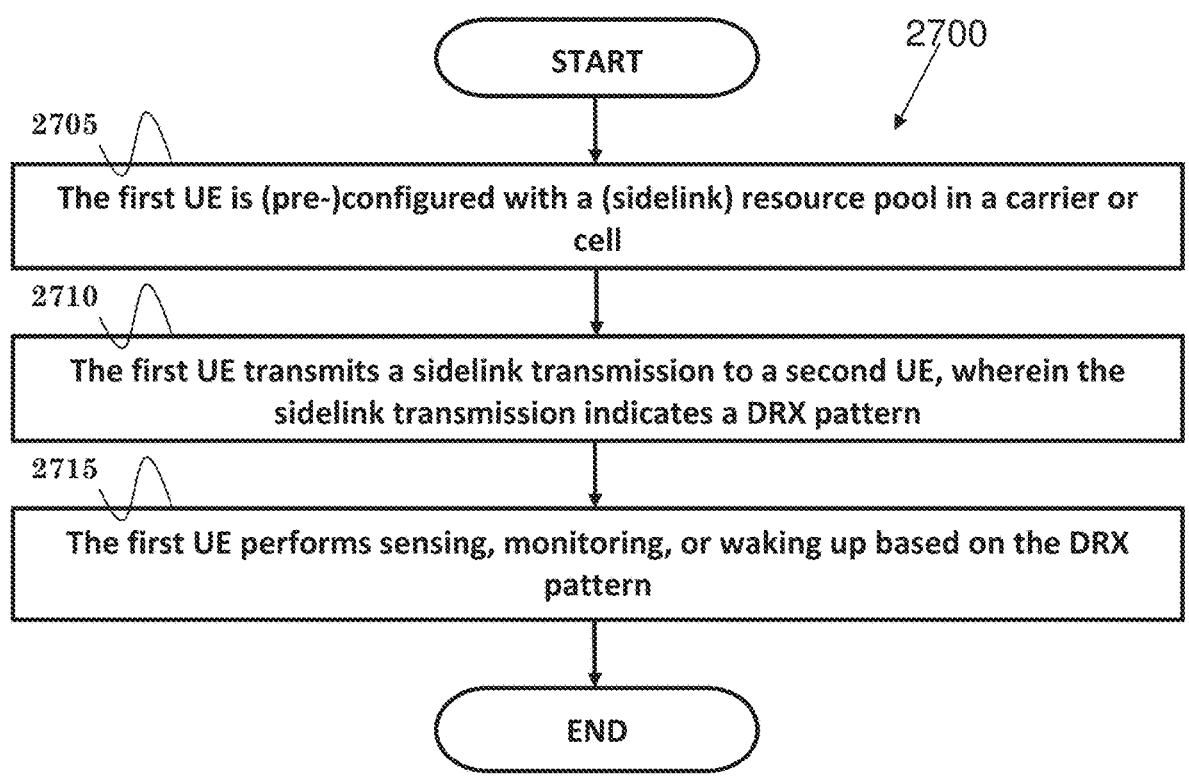
FIG. 27 is a flow chart according to one exemplary embodiment.

FIG. 27 is a flow chart 2700 according to one exemplary embodiment from the perspective of a first UE for performing sidelink communication. In step 2705, the first UE is (pre-)configured with a (sidelink) resource pool in a carrier or cell. In step 2710, the first UE transmits a sidelink transmission to a second UE, wherein the sidelink transmission indicates a DRX pattern. In step 2715, the first UE performs sensing, monitoring, or waking up based on the DRX pattern.

In one embodiment, the sidelink transmission could be broadcast, groupcast to a group comprising the second UE, or unicast to the second UE. The first UE may be (pre-)configured with a cycle or period in a periodic manner. The first cycle or period of the periodic cycles or periods may refer to SFN 0 or DFN 0.

In one embodiment, the first UE may apply the DRX pattern on future one or more cycle(s) or period(s). The first UE may apply the DRX pattern for each cycle or period repeatedly.

Referring back to FIGS. 3 and 4, in one exemplary embodiment of a first UE for performing sidelink communication, wherein the first UE is (pre-)configured with a (sidelink) resource pool in a carrier or cell. The first UE 300 includes a program code 312 stored in the memory 310. The CPU 308 could execute program code 312 to enable the first UE (i) to transmit a sidelink transmission to a second UE, wherein the sidelink transmission indicates a DRX pattern, and (ii) to perform sensing, monitoring, or waking up based on the DRX pattern. Furthermore, the CPU 308 can execute the program code 312 to perform all of the above-described actions and steps or others described herein.

Figure 28:
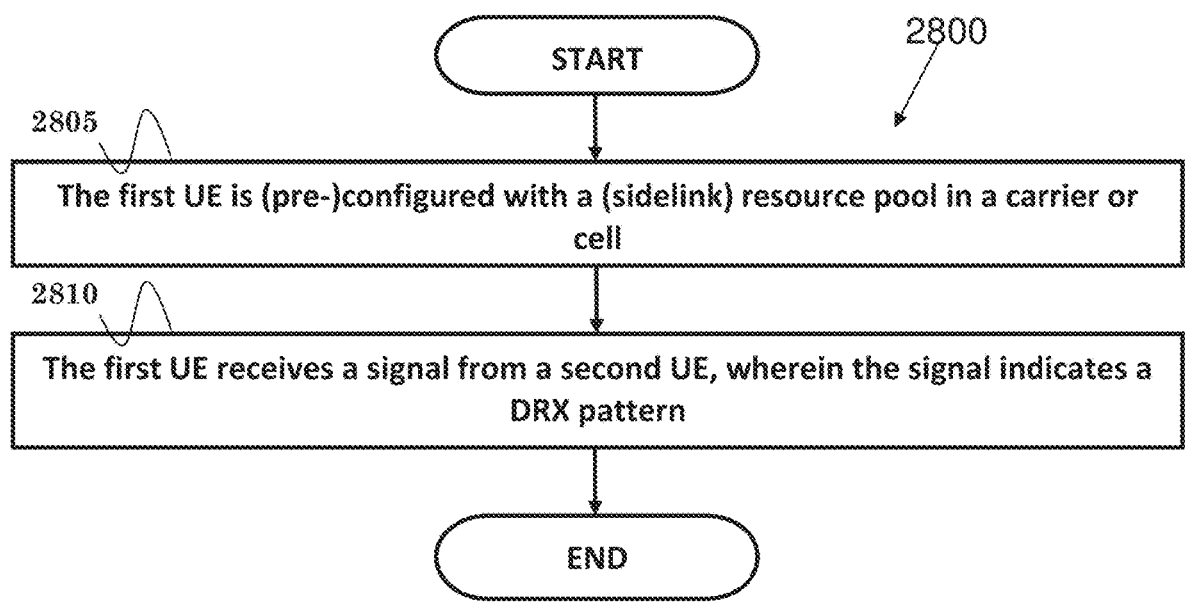
FIG. 28 is a flow chart according to one exemplary embodiment.

FIG. 28 is a flow chart 2800 according to one exemplary embodiment from the perspective of a first UE for performing sidelink communication. In step 2805, The first UE is (pre-)configured with a (sidelink) resource pool in a carrier or cell. In step 2810, the first UE receives a signal from a second UE, wherein the signal indicates a DRX pattern.

In one embodiment, the signal may indicate an available timer for the DRX pattern. The second UE could be a road side unit (RSU). The second UE could derive the DRX pattern based on congestion condition, CBR, or number of UEs in the sidelink resource pool. The signal may also indicate a starting timing for applying the DRX pattern.

Referring back to FIGS. 3 and 4, in one exemplary embodiment of a first UE for performing sidelink communication, wherein the first UE is (pre-)configured with a (sidelink) resource pool in a carrier or cell. The first UE 300 includes a program code 312 stored in the memory 310. The CPU 308 could execute program code 312 to enable the first UE to receive a signal from a second UE, wherein the signal indicates a DRX pattern. Furthermore, the CPU 308 can execute the program code 312 to perform all of the above-described actions and steps or others described herein.

Figure 29:
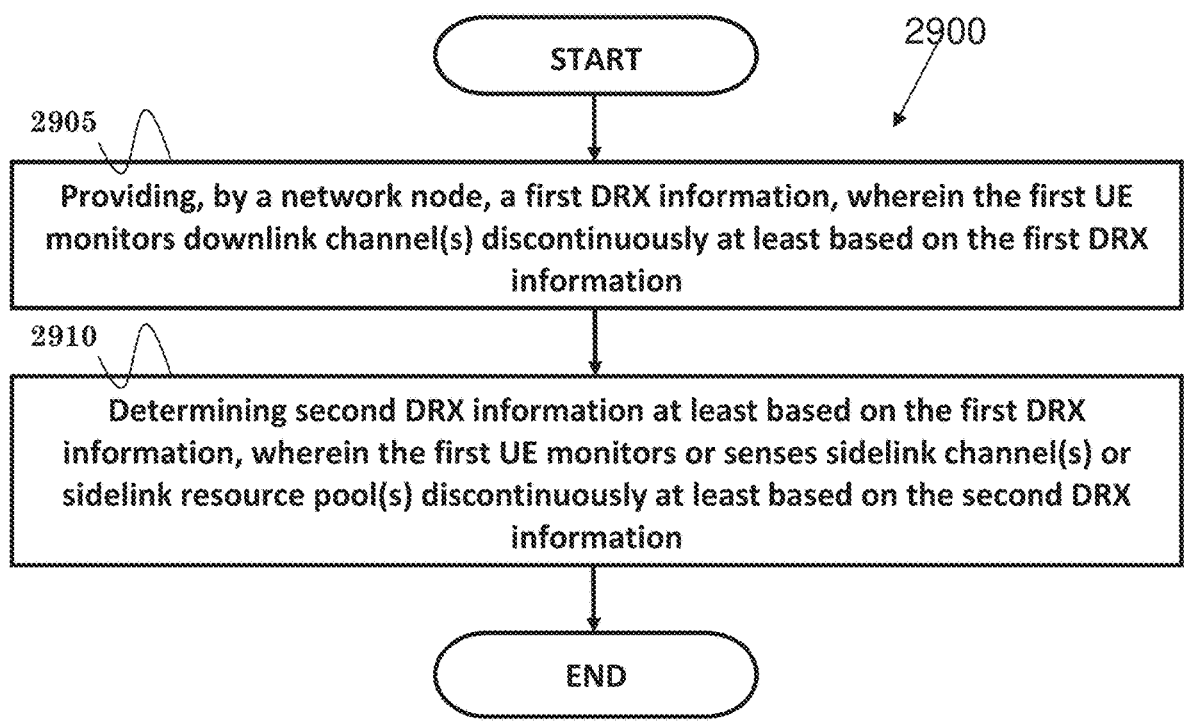
FIG. 29 is a flow chart according to one exemplary embodiment.

FIG. 29 is a flow chart 2900 according to one exemplary embodiment from the perspective of a first UE for performing sidelink communication. Step 2905 includes providing, by a network, a first DRX information, wherein the first UE monitors downlink channel(s) discontinuously at least based on the first DRX information. Step 2910 includes determining second DRX information at least based on the first DRX information, wherein the first UE monitors or senses sidelink channel(s) or sidelink resource pool(s) discontinuously at least based on the second DRX information.

Referring back to FIGS. 3 and 4, in one exemplary embodiment of a first UE for performing sidelink communication, wherein a network node provides a first DRX information, wherein the first UE monitors downlink channel(s) discontinuously at least based on the first DRX information. The first UE 300 includes a program code 312 stored in the memory 310. The CPU 308 could execute program code 312 to enable the first UE to determine second DRX information at least based on the first DRX information, wherein the first UE monitors or senses sidelink channel(s) or sidelink resource pool(s) discontinuously at least based on the second DRX information. Furthermore, the CPU 308 can execute the program code 312 to perform all of the above-described actions and steps or others described herein.

Figure 30:
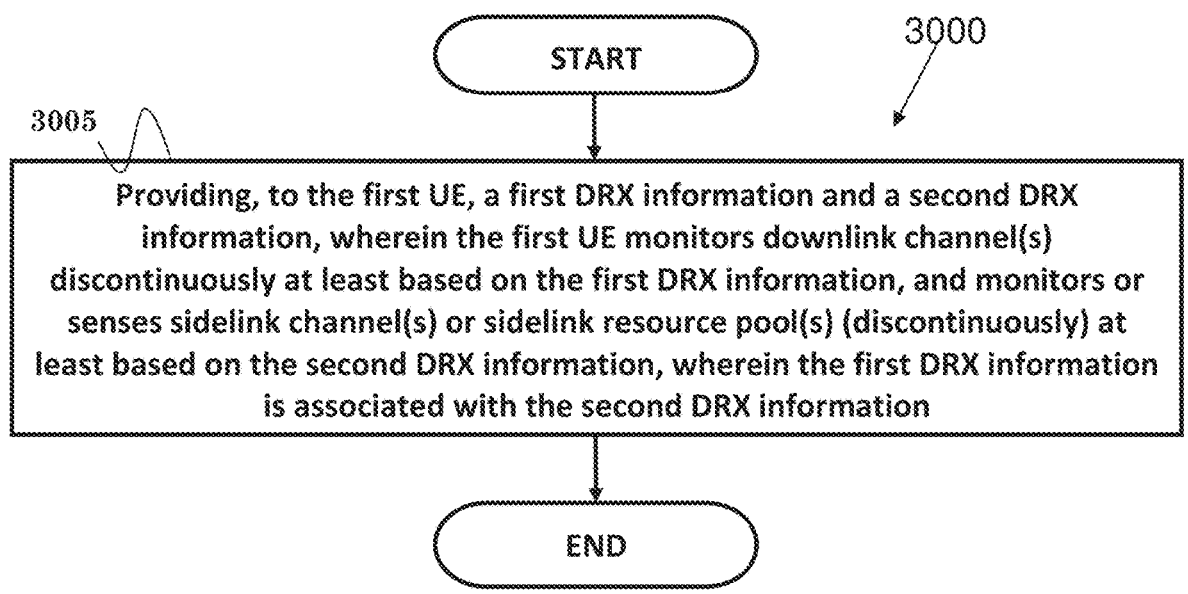
FIG. 30 is a flow chart according to one exemplary embodiment.

FIG. 30 is a flow chart 3000 according to one exemplary embodiment from the perspective of a network node providing DRX information to a first UE. In step 3005, the network node provides, to the first UE, a first DRX information and a second DRX information, wherein the first UE monitors downlink channel(s) discontinuously at least based on the first DRX information, and monitors or senses sidelink channel(s) or sidelink resource pool(s) (discontinuously) at least based on the second DRX information, wherein the first DRX information is associated with the second DRX information.

Referring back to FIGS. 3 and 4, in one exemplary embodiment of a network node providing DRX information to a first UE, the network node 300 includes a program code 312 stored in the memory 310. The CPU 308 could execute program code 312 to enable the network node to provide, to the first UE, a first DRX information and a second DRX information, wherein the first UE monitors downlink channel(s) discontinuously at least based on the first DRX information, and monitors or senses sidelink channel(s) or sidelink resource pool(s) (discontinuously) at least based on the second DRX information, wherein the first DRX information is associated with the second DRX information. Furthermore, the CPU 308 can execute the program code 312 to perform all of the above-described actions and steps or others described herein.

In the context of the embodiments shown in FIGS. 29 and 30 and discussed above, in one embodiment, the first DRX information may indicate one or more first DL subframes, slots, or symbols, wherein the first UE monitors the downlink channel(s) in the one or more first DL subframes, slots, or symbols. The first DRX information may also indicate one or more second DL subframes, slots, or symbols, wherein the first UE does not monitor the downlink channel(s) in the one or more second DL subframes, slots, or symbols. The first DRX information may include a timer, wherein the first UE monitors the downlink channel(s) when the timer is running.

In one embodiment, the second DRX information may indicate one or more first SL subframes, slots, or symbols, wherein the first UE monitors the sidelink channels or sidelink resource pools in the one or more first SL subframes, slots, or symbols. The second DRX information may also indicate one or more second SL subframes, slots, or symbols, wherein the first UE does not monitor the sidelink channels or sidelink resource pools in the one or more second SL subframes, slots, or symbols.

In one embodiment, the one or more first SL subframes, slots, or symbols may overlap with the one or more first DL subframes, slots, or symbols in time domain. The one or more first SL subframes, slots, or symbols may be (partially) the same subframes, slots, or symbols as the one or more first DL subframes, slots, or symbols (in time domain).

Alternatively, the one or more first SL subframes, slots, or symbols may not overlap with the one or more first DL subframes, slots, or symbols in time domain. However, the one or more second SL subframes, slots, or symbols may overlap with the one or more second DL subframes, slots, or symbols in time domain. Furthermore, the one or more second SL subframes, slots, or symbols may be (partially) the same subframes, slots, or symbols as the one or more second DL subframes, slots, or symbols (in time domain). Alternatively, the one or more second SL subframes, slots, or symbols may not overlap with the one or more second DL subframes, slots, or symbols in time domain.

In one embodiment, the downlink channel(s) may include PDCCH or PBCH (Physical Broadcast Channel). The sidelink channel(s) may include PSCCH (Physical Sidelink Control Channel), PSSCH (Physical Sidelink Shared Channel), or PSBCH (Physical Sidelink Broadcast Channel). The first or second DRX information may a RRC message.

Figure 31:
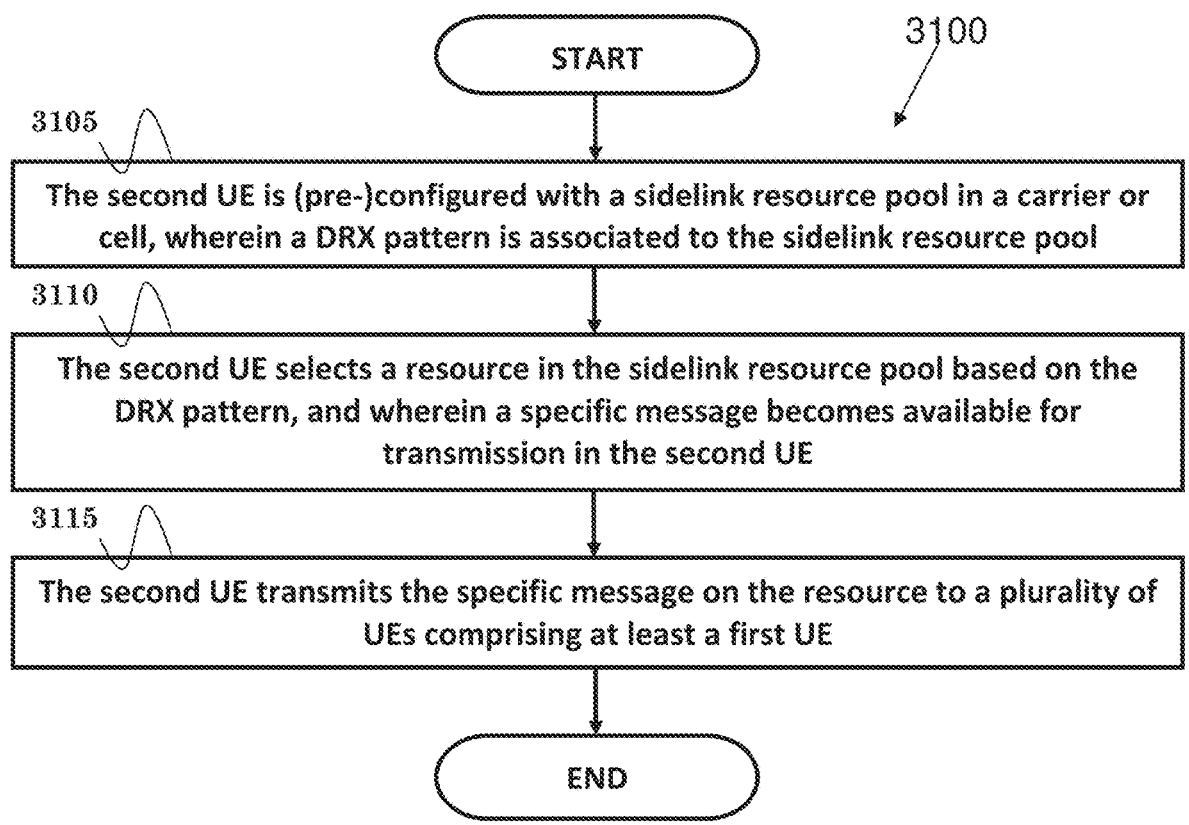
FIG. 31 is a flow chart according to one exemplary embodiment.

FIG. 31 is a flow chart 3100 according to one exemplary embodiment from the perspective of a second UE for performing sidelink communication. In step 3105, the second UE is (pre-)configured with a sidelink resource pool in a carrier or cell, wherein a DRX (Discontinuous Reception) pattern is associated to the sidelink resource pool. In step 3110, the second UE selects a resource in the sidelink resource pool based on the DRX pattern, wherein a specific message becomes available for transmission in the second UE. In step 3115, the second UE transmits the specific message on the resource to a plurality of UEs comprising at least a first UE.

In one embodiment, in response to the specific message becomes available for transmission in the second UE, the second UE selects the resource in the sidelink resource pool based on the DRX pattern. The DRX pattern may indicate an active duration and/or a sleep duration for a cycle. The active duration may be followed by the sleep duration in the cycle. The second UE may be limited to select (or may only select) the resource within the active duration of the DRX pattern. The resource within the active duration of the DRX pattern ensures that the first UE is able to monitor, detect, receive, or sense the specific message successfully. The specific message may comprise V2P message broadcast or groupcast to the plurality of UEs. The specific message may be transmitted to power saving UE(s).

In one embodiment, the first UE may apply the DRX pattern for a cycle repeatedly. The first UE may be configured with power saving. Furthermore, the first UE may perform monitoring sidelink resource(s) based on the DRX pattern. The first UE may also perform monitoring sidelink resource(s) on the active duration for each cycle, and may not perform monitoring sidelink resource(s) on the sleep duration for each cycle.

In one embodiment, the second UE could receive a sidelink transmission from one of the plurality of the UEs. The sidelink transmission could be used to activate for the DRX pattern (for delivering the specific message). Before the second UE receives the sidelink transmission, the second UE may not be limited to select the resource within the active duration of the DRX pattern for a cycle in the sidelink resource pool. After the second UE receives the sidelink transmission, the second UE may be limited to at least select the resource within the active duration of the DRX pattern for a cycle in the sidelink resource pool.

In one embodiment, for other message(s) except the specific message, the second UE may not be limited to select a resource within the active duration of the DRX pattern for a cycle in the sidelink resource pool. Furthermore, for other message(s) except the specific message, the second UE may select a resource for transmitting the other message(s) in the sidelink resource pool without considering the DRX pattern. The other message(s) may be a V2V (Vehicle-to-Vehicle) message or a V2X (Vehicle-to-Everything) message which is not utilized or received by a pedestrian UE.

In one embodiment, the second UE could select the resource based on sensing result associated to the sidelink resource pool. Furthermore, the second UE could perform sensing or monitoring one or more sidelink control information in the sidelink resource pool. In addition, the second UE could exclude one or more resource(s) associated to or indicated by the one or more sidelink control information, wherein the one or more resource(s) is reserved or occupied by the one or more sidelink control information(s), and wherein, for the one or more resource(s) associated to one sidelink control information of the one or more control information(s), the one or more resource(s) and the one sidelink control information are in same or different time resource or slot in the sidelink resource pool.

In one embodiment, the plurality of UE(s), without performing sidelink transmission during active time of the DRX pattern for each cycle, could at least perform sensing or monitoring the sidelink resource pool during the active time of the DRX pattern for each cycle.

Referring back to FIGS. 3 and 4, in one exemplary embodiment of a second UE for performing sidelink communication. In one embodiment, the second UE may be (pre-) configured with a sidelink resource pool in a carrier or cell, wherein a DRX pattern is associated to the sidelink resource pool. The second UE 300 includes a program code 312 stored in the memory 310. The CPU 308 could execute program code 312 to enable the second UE (i) to select a resource in the sidelink resource pool based on the DRX pattern, wherein a specific message becomes available for transmission in the second UE, and (ii) to transmit the specific message on the resource to a plurality of UEs comprising at least a first UE. Furthermore, the CPU 308 can execute the program code 312 to perform all of the above-described actions and steps or others described herein.

Figure 32:
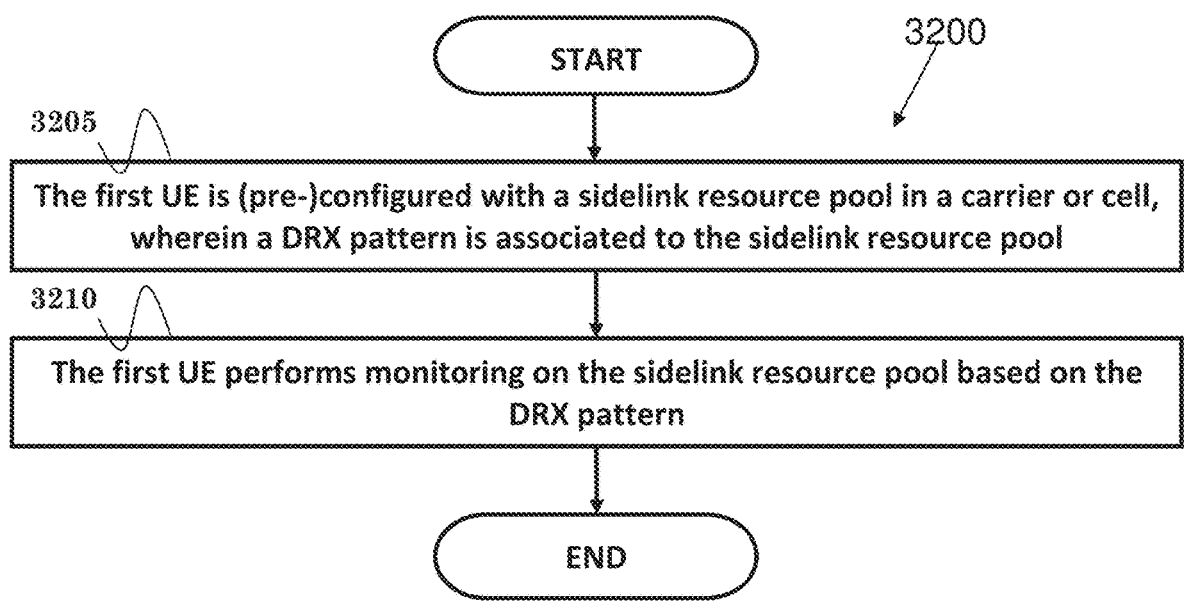
FIG. 32 is a flow chart according to one exemplary embodiment.

FIG. 32 is a flow chart 3200 according to one exemplary embodiment from the perspective of a first UE for performing sidelink communication. In step 3205, the first UE is (pre-)configured with a sidelink resource pool in a carrier or cell, wherein a DRX pattern is associated to the sidelink resource pool. In step 3210, the first UE performs monitoring on the sidelink resource pool based on the DRX pattern.

In one embodiment, the DRX pattern may indicate an active duration or a sleep duration for a cycle. The active duration may be followed by the sleep duration in the cycle. The first UE may receive a specific message on a resource, and the resource is in the active duration of the DRX pattern. The specific message may comprise V2P message broadcast or groupcast to the plurality of UEs. The specific message may be transmitted to pedestrian or power saving UE(s).

In one embodiment, the first UE may be a pedestrian or power saving UE. The first UE may apply the DRX pattern for a cycle repeatedly. Furthermore, the first UE may perform monitoring sidelink resource(s) on the active duration for each cycle, and may not perform monitoring sidelink resource(s) on the sleep duration for each cycle.

Referring back to FIGS. 3 and 4, in one exemplary embodiment of a first UE for performing sidelink communication. In one embodiment, the first UE may be (pre-)configured with a sidelink resource pool in a carrier or cell, wherein a DRX pattern is associated to the sidelink resource pool. The first UE 300 includes a program code 312 stored in the memory 310. The CPU 308 could execute program code 312 to enable the first UE to perform monitoring on the sidelink resource pool based on the DRX pattern. Furthermore, the CPU 308 can execute the program code 312 to perform all of the above-described actions and steps or others described herein.

Figure 33:
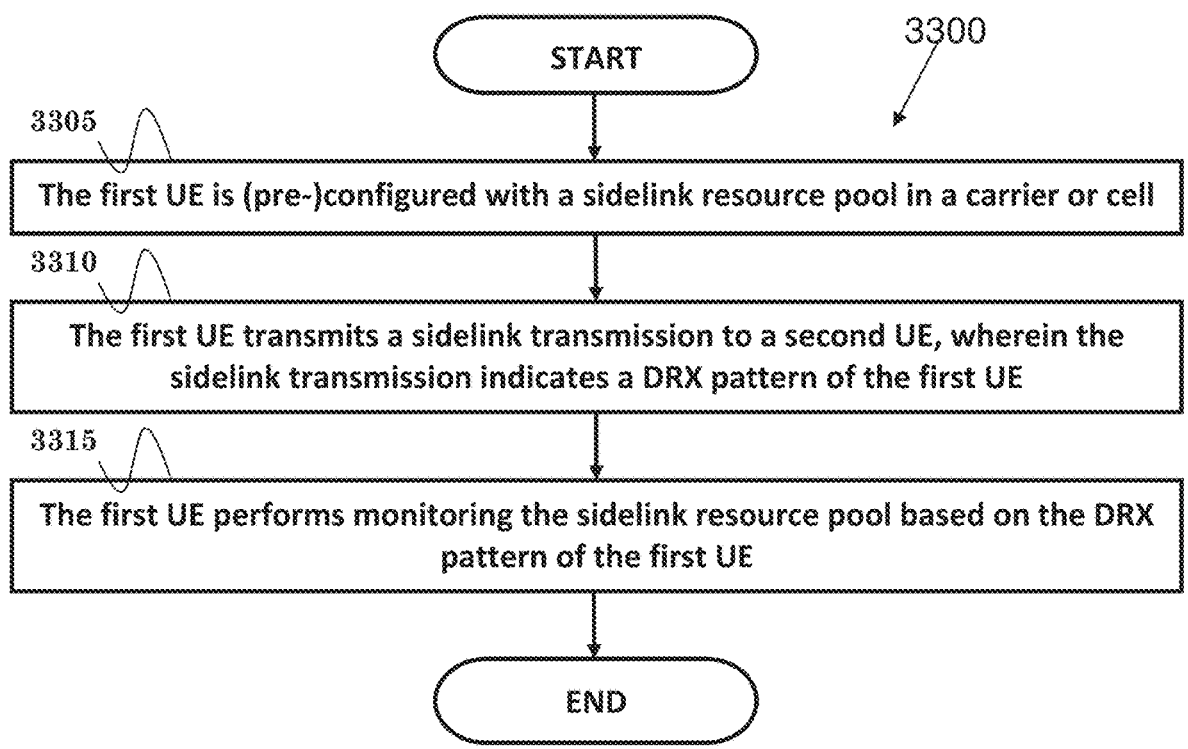
FIG. 33 is a flow chart according to one exemplary embodiment.

FIG. 33 is a flow chart 3300 according to one exemplary embodiment from the perspective of a first UE for performing sidelink communication. In step 3305, the first UE is (pre-)configured with a sidelink resource pool in a carrier or cell. In step 3310, the first UE transmits a sidelink transmission to a second UE, wherein the sidelink transmission indicates a DRX pattern of the first UE. In step 3315, the first UE performs monitoring the sidelink resource pool based on the DRX pattern of the first UE.

In one embodiment, the DRX pattern of the first UE may indicate an active duration or a sleep duration for a cycle. The active duration may be followed by the sleep duration in the cycle. The first UE may receive a specific message on a resource in the active duration of the DRX pattern of the first UE. The specific message may be a dedicated or unicast message to the first UE.

In one embodiment, the first UE may apply the DRX pattern for a cycle repeatedly. Furthermore, the first UE may be configured with power saving. In addition, the first UE may perform monitoring sidelink resource(s) based on the DRX pattern, wherein the first UE performs monitoring sidelink resource(s) on the active duration for each cycle, and may not perform monitoring sidelink resource(s) on the sleep duration for each cycle.

In one embodiment, the first UE may establish a unicast sidelink or a groupcast sidelink with the second UE. The sidelink transmission may be unicast transmission or groupcast transmission.

Referring back to FIGS. 3 and 4, in one exemplary embodiment of a first UE for performing sidelink communication. In one embodiment, the first UE is (pre-)configured with a sidelink resource pool in a carrier or cell. The first UE 300 includes a program code 312 stored in the memory 310. The CPU 308 could execute program code 312 to enable the first UE (i) to transmit a sidelink transmission to a second UE, wherein the sidelink transmission indicates a DRX pattern of the first UE, and (ii) to perform monitoring the sidelink resource pool based on the DRX pattern of the first UE. Furthermore, the CPU 308 can execute the program code 312 to perform all of the above-described actions and steps or others described herein.

Figure 34:
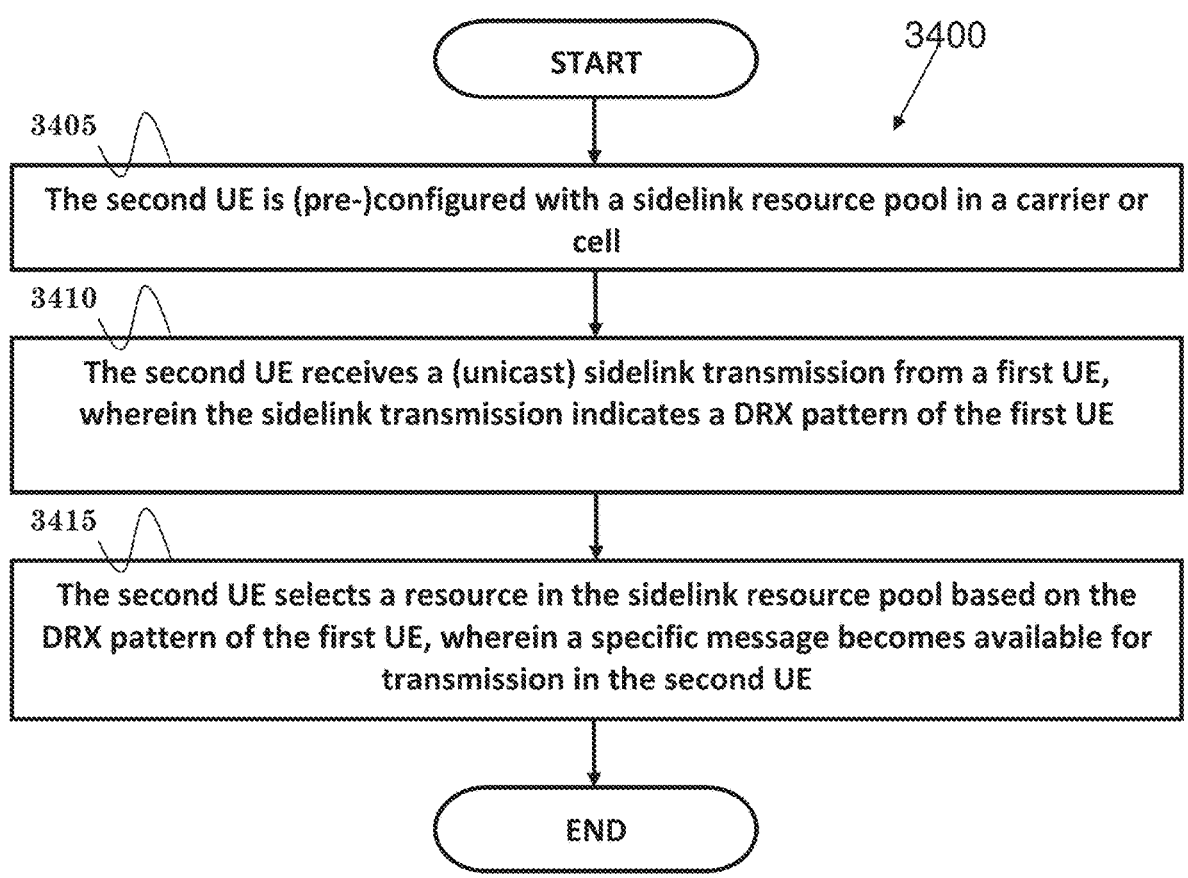
FIG. 34 is a flow chart according to one exemplary embodiment.

FIG. 34 is a flow chart 3400 according to one exemplary embodiment from the perspective of a second UE for performing sidelink communication. In step 3405, the second UE is (pre-)configured with a sidelink resource pool in a carrier or cell. In step 3410, the second UE receives a (unicast) sidelink transmission from a first UE, wherein the sidelink transmission indicates a DRX pattern of the first UE. In step 3415, the second UE selects a resource in the sidelink resource pool based on the DRX pattern of the first UE, wherein a specific message becomes available for transmission in the second UE. In step 3420, the second UE transmits the specific message on the resource to the first UE.

In one embodiment, the DRX pattern of the first UE may indicate an active duration or a sleep duration for a cycle. The active duration is followed by the sleep duration in the cycle.

In one embodiment, the second UE may be limited to selecting (or may only select) the resource within the active duration of the DRX pattern of the first UE. The resource within the active duration of the DRX pattern ensures that the first UE is able to monitor, detect, receive, or sense the specific message successfully. The specific message may be dedicated or unicast message to the first UE.

In one embodiment, the first UE may apply the DRX pattern for a cycle repeatedly. The first UE could be configured with power saving. The first UE could perform monitoring sidelink resource(s) based on the DRX pattern. Furthermore, the first UE may perform monitoring sidelink resource(s) on the active duration for each cycle, and may not perform monitoring sidelink resource(s) on the sleep duration for each cycle.

In one embodiment, for other message(s) for other UE(s) except the first UE, the second UE may not be limited to select a resource within the active duration of the DRX pattern for a cycle. The second UE could establish a unicast sidelink or a groupcast sidelink with the first UE. The sidelink transmission is unicast transmission or groupcast transmission.

In one embodiment, the second UE could select the resource based on sensing result associated to the sidelink resource pool. The second UE could also perform sensing or monitoring one or more sidelink control information in the sidelink resource pool.

In one embodiment, the second UE could exclude one or more resource(s) associated to or indicated by the one or more sidelink control information, wherein the one or more resource(s) is reserved or occupied by the one or more sidelink control information(s). For the one or more resource(s) associated to one sidelink control information of the one or more control information(s), the one or more resource(s) and the one sidelink control information could be in a same or different time resource or slot in the sidelink resource pool.

Referring back to FIGS. 3 and 4, in one exemplary embodiment of a second UE for performing sidelink communication. In one embodiment, the second UE is (pre-) configured with a sidelink resource pool in a carrier or cell. The second UE 300 includes a program code 312 stored in the memory 310. The CPU 308 could execute program code 312 to enable the second UE (i) to receive a (unicast) sidelink transmission from a first UE, wherein the sidelink transmission indicates a DRX pattern of the first UE, and (ii) to select a resource in the sidelink resource pool based on the DRX pattern of the first UE, wherein a specific message becomes available for transmission in the second UE, and (iii) to transmit the specific message on the resource to the first UE. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a second UE (User Equipment) for performing sidelink communication, comprising:
   the second UE is (pre-)configured with a sidelink resource pool in a carrier or cell, wherein a DRX (Discontinuous Reception) pattern is associated to the sidelink resource pool;
   the second UE selects a resource in the sidelink resource pool within an active duration of the DRX pattern, wherein a specific message becomes available for transmission in the second UE;
   the second UE receives a sidelink transmission from one of a plurality of UEs, wherein the sidelink transmission is used to activate for the DRX pattern for delivering the specific message, wherein before the second UE receives the sidelink transmission, the second UE is not limited to select the resource within the active duration of the DRX pattern for a cycle in the sidelink resource pool, and wherein after the second UE receives the sidelink transmission, the second UE is limited to at least select the resource with the active duration of the DRX pattern for a cycle in the sidelink resource pool; and
   the second UE transmits the specific message on the resource to the plurality of UEs comprising at least a first UE.

2. The method of claim 1, wherein the DRX pattern indicates an active duration and/or a sleep duration for a cycle, or the active duration is followed by the sleep duration in the cycle.

3. The method of claim 1, wherein the second UE is limited to select (or only selects) the resource within active duration of the DRX pattern, or
   wherein the resource within active duration of the DRX pattern ensures that the first UE is able to monitor, detect, receive, or sense the specific message successfully.

4. The method of claim 1, wherein the specific message comprises V2P message broadcast or groupcast to the plurality of UEs, or
   wherein the specific message is transmitted to power saving UE(s).

5. The method of claim 1, wherein the first UE applies the DRX pattern for a cycle repeatedly,
   wherein the first UE is configured with power saving,
   wherein the first UE performs monitoring sidelink control information based on the DRX pattern, and
   wherein the first UE performs monitoring sidelink control information in active duration for each cycle, and does not perform monitoring sidelink control information in sleep duration for each cycle.

6. The method of claim 1, wherein:
   for other message(s) except the specific message, the second UE is not limited to select a resource within active duration of the DRX pattern for a cycle in the sidelink resource pool; or
   for other message(s) except the specific message, the second UE selects a resource for transmitting the other message(s) in the sidelink resource pool without considering the DRX pattern; or
   the other message(s) is a V2V (Vehicle-to-Vehicle) message or a V2X (Vehicle-to-Everything) message which is not utilized or received by a pedestrian UE.

7. The method of claim 1, wherein:
   the second UE selects the resource based on sensing result associated to the sidelink resource pool; or
   the second UE performs sensing or monitoring one or more sidelink control information in the sidelink resource pool; or
   the second UE excludes one or more resource(s) associated to or indicated by the one or more sidelink control information, wherein the one or more resource(s) is reserved or occupied by the one or more sidelink control information(s), and wherein, for the one or more resource(s) associated to one sidelink control information of the one or more control information(s), the one or more resource(s) and the one sidelink control information are in same or different time resource or slot in the sidelink resource pool.

8. The method of claim 1, wherein the plurality of UEs, without performing sidelink transmission during active time of the DRX pattern for each cycle, at least performs sensing or monitoring sidelink control information in the sidelink resource pool during the active time of the DRX pattern for each cycle.

9. A method of a first UE (User Equipment) for performing sidelink communication, comprising:
   the first UE is (pre-)configured with a sidelink resource pool in a carrier or cell;
   the first UE transmits a sidelink transmission to a second UE for requesting a second DRX pattern, wherein the sidelink transmission includes information associated with a first DRX (Discontinuous Reception) pattern of the first UE;
   the first UE receives a specific message from the second UE, wherein the specific message includes information associated with the second DRX pattern; and
   the first UE performs monitoring sidelink control information in the sidelink resource pool based on the second DRX pattern.

10. The method of claim 9, wherein information associated with the first DRX pattern of the first UE indicates an active duration or a sleep duration for a cycle, or the active duration is followed by the sleep duration in the cycle.

11. The method of claim 9, wherein the first UE receives the specific message on a resource in active duration of the first DRX pattern of the first UE, or wherein the specific message is a dedicated or unicast message to the first UE.

12. The method of claim 9, wherein:
   the first UE applies the second DRX pattern for a cycle repeatedly; or
   the information associated with the second DRX pattern indicates an active duration or a sleep duration for the cycle, or the active duration is followed by the sleep duration in the cycle; or
   the first UE is configured with power saving; or
   the first UE performs monitoring sidelink control information based on the second DRX pattern, wherein the first UE performs monitoring sidelink control information in the active duration for each cycle, and does not perform monitoring sidelink control information in the sleep duration for each cycle.

13. The method of claim 9, wherein the first UE establishes a unicast sidelink or a groupcast sidelink with the second UE, or wherein the sidelink transmission is unicast transmission or groupcast transmission.

14. A first UE (User Equipment) for performing sidelink communication, comprising:
   a memory; and
   a processor operatively coupled with the memory, wherein the processor is configured to execute program code to:

be (pre-)configured with a sidelink resource pool in a carrier or cell;

transmit a sidelink transmission to a second UE for requesting a second DRX (Discontinuous Reception) pattern, wherein the sidelink transmission includes information associated with a first DRX pattern of the first UE;

receive a specific message from the second UE, wherein the specific message includes information associated with the second DRX pattern; and perform monitoring of sidelink control information in the sidelink resource pool based on the second DRX pattern.

15. The first UE of claim 14, wherein information associated with the first DRX pattern of the first UE indicates an active duration or a sleep duration for a cycle.

16. The first UE of claim 15, wherein the active duration is followed by the sleep duration in the cycle.

17. The first UE of claim 14, wherein the processor is further configured to execute program code to receive the specific message on a resource in active duration of the first DRX pattern of the first UE, or wherein the specific message is a dedicated or unicast message to the first UE.

18. The first UE of claim 14, wherein the processor is further configured to execute program code to:
apply the second DRX pattern for a cycle repeatedly; or
be configured with power saving; or
perform monitoring sidelink control information based on the second DRX pattern, wherein the first UE performs monitoring sidelink control information in active duration for each cycle, and does not perform monitoring sidelink control information in sleep duration for each cycle.

19. The first UE of claim 14, wherein the processor is further configured to execute program code to establish a unicast sidelink or a groupcast sidelink with the second UE.

20. The first UE of claim 14, wherein the sidelink transmission is a unicast transmission or a groupcast transmission.

* * * * *